(12) United States Patent
Li et al.

(10) Patent No.: US 12,177,135 B2
(45) Date of Patent: *Dec. 24, 2024

(54) OFFLOAD OF STORAGE NODE SCALE-OUT MANAGEMENT TO A SMART NETWORK INTERFACE CONTROLLER

(71) Applicant: Intel Corporation, Santa Clara, CA (US)

(72) Inventors: Yadong Li, Portland, OR (US); Scott D. Peterson, Beaverton, OR (US); Sujoy Sen, Beaverton, OR (US); David B. Minturn, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 1 day.

This patent is subject to a terminal disclaimer.

(21) Appl. No.: 17/971,029

(22) Filed: Oct. 21, 2022

(65) Prior Publication Data

US 2023/0111490 A1     Apr. 13, 2023

Related U.S. Application Data

(63) Continuation of application No. 16/728,546, filed on Dec. 27, 2019, now Pat. No. 11,509,606, which is a
(Continued)

(51) Int. Cl.
*H04L 49/356* (2022.01)
*G06F 12/1081* (2016.01)
(Continued)

(52) U.S. Cl.
CPC ........ *H04L 49/356* (2013.01); *G06F 12/1081* (2013.01); *H04L 9/0643* (2013.01);
(Continued)

(58) Field of Classification Search
CPC . H04L 49/356; H04L 49/3009; H04L 9/0643; H04L 67/1097; H04L 45/54;
(Continued)

(56) References Cited

U.S. PATENT DOCUMENTS 6,687,240 B1    2/2004  Moertl et al.
7,237,027 B1    6/2007  Raccah et al.
(Continued)

FOREIGN PATENT DOCUMENTS

WO      2019089057 A1    5/2019

OTHER PUBLICATIONS

Advisory Action for U.S. Appl. No. 16/023,025, Mailed Mar. 24, 2020, 3 pages.
(Continued)

*Primary Examiner* — Johnny B Aguiar
(74) *Attorney, Agent, or Firm* — Compass IP Law PC

(57) ABSTRACT

Examples described herein relate to a network interface that includes an initiator device to determine a storage node associated with an access command based on an association between an address in the command and a storage node. The network interface can include a redirector to update the association based on messages from one or more remote storage nodes. The association can be based on a look-up table associating a namespace identifier with prefix string and object size. In some examples, the access command is compatible with NVMe over Fabrics. The initiator device can determine a remote direct memory access (RDMA) queue-pair (QP) lookup for use to perform the access command.

19 Claims, 24 Drawing Sheets

Related U.S. Application Data continuation-in-part of application No. 16/109,606, filed on Aug. 22, 2018, now Pat. No. 10,592,162, and a continuation-in-part of application No. 16/023,025, filed on Jun. 29, 2018, now abandoned.

(60) Provisional application No. 62/878,742, filed on Jul. 25, 2019.

(51) Int. Cl.
*H04L 9/06* (2006.01)
*H04L 45/00* (2022.01)
*H04L 49/00* (2022.01)
*H04L 67/1097* (2022.01)

(52) U.S. Cl.
CPC .......... *H04L 45/54* (2013.01); *H04L 49/3009* (2013.01); *H04L 67/1097* (2013.01)

(58) Field of Classification Search
CPC ............. H04L 49/1569; H04L 45/7453; H04L 47/125; H04L 45/745; G06F 12/1081
See application file for complete search history.

(56) References Cited

U.S. PATENT DOCUMENTS

| | | | |
|---|---|---|---|
| 8,799,413 | B2 | 8/2014 | Taylor et al. |
| 2006/0031506 | A1 | 2/2006 | Redgate |
| 2006/0085388 | A1 | 4/2006 | Shinohara et al. |
| 2007/0022121 | A1 | 1/2007 | Bahar et al. |
| 2013/0031229 | A1 | 1/2013 | Shiga et al. |
| 2013/0304872 | A1* | 11/2013 | Flynn .................... G06F 3/0604 709/219 |
| 2014/0222945 | A1* | 8/2014 | Noronha ............... H04L 63/101 709/212 |
| 2014/0281040 | A1* | 9/2014 | Liu .......................... G06F 9/50 710/3 |
| 2014/0325013 | A1* | 10/2014 | Tamir .................... G06F 3/0655 709/212 |
| 2014/0372715 | A1 | 12/2014 | Bak et al. |
| 2015/0006663 | A1* | 1/2015 | Huang ................. H04L 67/1097 709/213 |
| 2015/0012495 | A1 | 1/2015 | Prahlad et al. |
| 2015/0106420 | A1 | 4/2015 | Warfield et al. |
| 2015/0378605 | A1 | 12/2015 | Huang |
| 2016/0127492 | A1 | 5/2016 | Malwankar et al. |
| 2017/0102874 | A1* | 4/2017 | Ouchi ................... G06F 3/0631 |
| 2017/0177541 | A1 | 6/2017 | Berman et al. |
| 2017/0249281 | A1* | 8/2017 | Tamir ...................... G06F 21/79 |
| 2018/0004559 | A1* | 1/2018 | Geml .................. G06F 21/6209 |
| 2018/0018231 | A1 | 1/2018 | Okada et al. |
| 2018/0095915 | A1 | 4/2018 | Prabhakar et al. |
| 2018/0260125 | A1 | 9/2018 | Botes et al. |
| 2019/0042133 | A1 | 2/2019 | Peterson et al. |
| 2019/0042144 | A1 | 2/2019 | Peterson et al. |
| 2019/0141041 | A1 | 5/2019 | Bhabbur et al. |

OTHER PUBLICATIONS

Dave Minturn, NVM Express Over Fabrics, 11th International Openfabrics Sofware Developer's Workshop, 2015, Intel Corp. (Year: 2015).

David Karger, Consistent Hashing and Random Trees, 1997, ACM Digital Library (Year: 1997).

European First Office Action, (EP Exam Report Article 94(3) EPC), for Patent Application No. 20164983.7, Mailed Nov. 8, 2022, 6 pages.

Extended European Search Report for Patent Application No. 20164983.7, Mailed Jul. 15, 2020, 7 pages.

Final Office Action for U.S. Appl. No. 16/023,025, Mailed Jan. 31, 2020, 24 pages.

Final Office Action for U.S. Appl. No. 16/728,546, Mailed Feb. 11, 2022, 18 pages.

First Office Action for U.S. Appl. No. 16/023,025, Mailed Oct. 24, 2019, 25 pages.

First Office Action for U.S. Appl. No. 16/109,606, Mailed Oct. 10, 2019, 7 pages.

FirstOffice Action for U.S. Appl. No. 16/728,546, Mailed Oct. 1, 2021, 22 pages.

Hai Sun, Yan Sun, Victor C. Valgenti, A highly deterministic hashing scheme using bitmap filter for high speed networking. 2015 International Conference on Computing, Networking and Communications (ICNC), pp. 778-784. IEEE 2015 (Year: 2015).

Notice of Allowance for U.S. Appl. No. 16/109,606, Mailed Nov. 4, 2019, 9 pages.

Notice of Allowance for U.S. Appl. No. 16/728,546, Mailed Jul. 7, 2022, 17 pages.

NVM Express, "NVM Express Revision 1.3", http://nvmexpress.org, May 1, 2017, 282 pages.

NVM Express, "NVM Express™ over Fabrics", Revision 1.0a, http://nvmexpress.org, Jul. 17, 2018, 51 pages.

NVM Express, "NVMe over Fabrics", downloaded from https://nvmexpress.org/white-papers/ Sep. 8, 2021, 7 pages.

Sen, Sujoy, et. al., "Distributed Block Storage using NVMe-over-Fabric", SCC18, Sep. 24-27, 2018 Santa Clara, CA, www.storagedeveloper.org, 13 pages.

\* cited by examiner

OFFLOAD OF STORAGE NODE SCALE-OUT MANAGEMENT TO A SMART NETWORK INTERFACE CONTROLLER

RELATED APPLICATION

The present application is a continuation of U.S. patent application Ser. No. 16/728,546, filed Dec. 27, 2019, entitled "OFFLOAD OF STORAGE NODE SCALE-OUT MANAGEMENT TO A SMART NETWORK INTERFACE CONTROLLER". U.S. patent application Ser. No. 16/728,546 claims benefit of priority of U.S. Provisional Patent Application No. 62/878,742, filed Jul. 25, 2019, entitled "OFFLOAD OF STORAGE NODE SCALE-OUT MANAGEMENT TO A SMART NETWORK INTERFACE CONTROLLER" and incorporates the contents of that application in its entirety.

The present application is a continuation-in-part of U.S. patent application Ser. No. 16/023,025, filed Jun. 29, 2018, entitled "TECHNOLOGIES FOR PROVIDING ADAPTIVE DATA ACCESS REQUEST ROUTING IN A DISTRIBUTED STORAGE SYSTEM," inventors Peterson and Sen and the present application is also a continuation-in-part of U.S. patent application Ser. No. 16/109,606, filed Aug. 22, 2018, entitled "DISTRIBUTED STORAGE LOCATION HINTING FOR NON-VOLATILE MEMORIES," inventors Peterson et al., and claim the benefit of priority of both applications and incorporate both applications in their entirety.

DESCRIPTION

Distributed block storage systems provide block device functionality to applications by presenting logical block devices that are stored in segments scattered across a large pool of remote storage devices. To use these logical block devices, applications need to determine the location of all the segments they need to access. Querying a directory service for the segment location before each input/output (I/O) request greatly increases access latency. Determining them all in advance places unacceptable overhead on the system keeping that location information up to date. Popular large-scale distributed storage systems like Ceph (available at www.ceph.com) and Gluster (available at docs.gluster.org) use consistent hashing to minimize the cost of determining logical block device segment locations on demand. Unfortunately, these hashing techniques cannot be used throughout large scale distributed storage in datacenters. Neither of these are standard storage protocols, and both require specific software in the client device to enable access to this storage. The client device software has a significant runtime and operational cost. These techniques also require the client device using the storage to have access to the storage cluster. Some client devices are untrusted, so that form of access presents an unacceptable security risk.

The problem of performance overhead in the client device is exacerbated when the client device runs on a limited resourced location such as a smart network interface card (NIC) or offloaded device. Data centers can be required to deploy large numbers of gateway machines to enable applications running on client systems to use the distributed block storage service. This adds to latency and inefficient use of network resources because of the extra hops that are required to get to the actual data node.

One approach is to use native distributed storage client devices. Any storage node can run a block device client. Virtual machines (VMs) can be isolated from this via distributed block gateways integrated into the hypervisor. For "bare metal" computing systems or containers there are some kernel implementations, but often a user mode gateway is required. These local gateways are not lightweight and require the cluster administrator to trust the node that runs them.

Another approach is to use dedicated storage gateways. Isolation for untrusted and bare metal applications can be accomplished by using a large number of dedicated gateways (e.g., those using Internet Small Computer Systems Interface (iSCSI)). These appear to the application like a traditional storage array. They must collectively provide high availability, multipath I/O (MPIO), and load balancing just like a traditional storage array. However, this adds one network hop for all storage operations (i.e., initiator to gateway, and gateway to cluster), thereby decreasing system efficiency.

Yet another approach is to use distributed clients in a smart NIC. This includes a storage client like Ceph Reliable Autonomic Distributed Object Store (RADOS) block device (RBD) in the smart NIC and present the RBD volume to the bare metal host, container, or VM as a standard hardware block (e.g., a non-volatile memory express (NVMe) device supporting the Non-Volatile Memory Express (NVMe) Specification, revision 1.3c, published on May 24, 2018 ("NVMe specification") or later revisions). This solves application connectivity issues by using NVMe as a common protocol but requires a complex NIC implementation. NICs with enough processing cores to perform this processing may consume too much of the power and cooling budget of a compute host housing the NIC to an unacceptable degree. The Ceph client code is fairly complex, and best treated as a package that can be updated with the rest of the Ceph cluster. When embedded as a NIC offload, that may become difficult as cluster administrators or tenants can't necessarily be trusted to manage software embedded in the NIC that enforces isolation of tenants from each other and the datacenter management network.

Non-volatile Memory Express over Fabrics (NVMe-oF™) compatible devices provide high performance NVMe® drives to remote systems, providing a low latency, efficient and high-performance solution for storage over network. However, NVMe-oF™ has a very limited deployment in cloud environments where multitudes of storage nodes are available for use, because of lack of a scale-out solution in a highly distributed storage environment.

BRIEF DESCRIPTION OF THE DRAWINGS

FIG. 17 depicts a process flow for access of a remote storage node using NVMe-oF.

DETAILED DESCRIPTION

Figure 1:
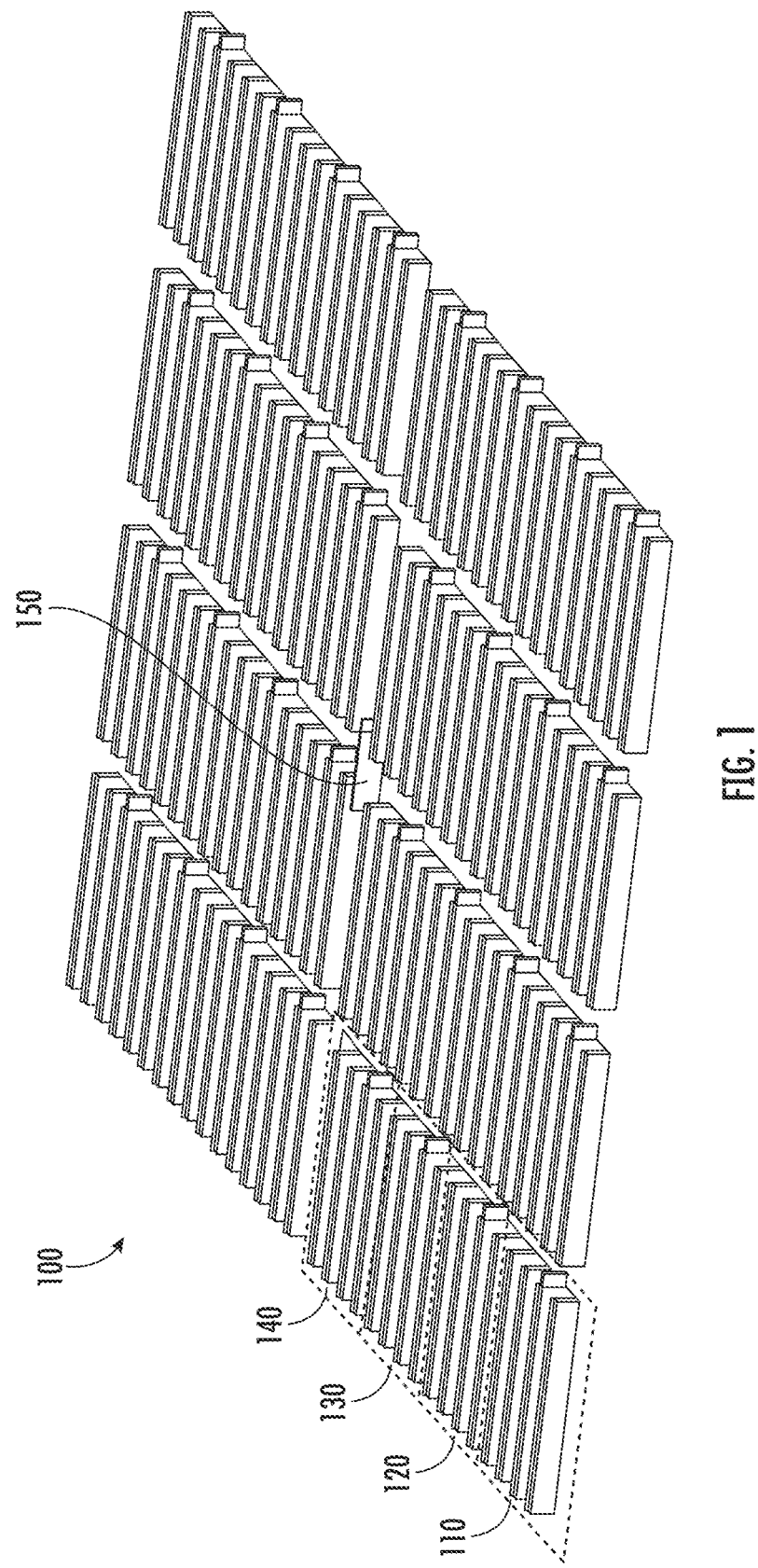
FIG. 1 is a simplified diagram of at least one embodiment of a data center for executing workloads with disaggregated resources.

Various embodiments provide distributed storage location hinting in a computing system supporting NVMe over an interconnect fabric. NVMe over an interconnect fabric is described in the NVMe Over Fabric (NVMe-oF) Specification, revision 1.1, published in June 2016 (available at nvmexpress.org), and variations and revisions thereof, the entirety of which is incorporated herein by reference. Embodiments include changes to NVMe-oF to improve the delivery of location hints. These mechanisms can be used to handle failover of replicated NVMe-of targets, and striping across multiple NVMe-oF targets. The hinting mechanism of embodiments include consistent hashing compatible with distributed storage systems such as Ceph and Gluster (Ceph and Gluster are referenced herein as examples and in other implementations other distributed storage systems may be used). This consistent hash form of algorithmic location hints allows client devices to determine on their own which storage node should contain each region of the logical block device and to send the I/O request directly to that storage node. The simple form of location hinting mechanism is used to handle the temporary situations where objects in a storage cluster are not yet where they should be.

Embodiments provide logical block devices (consistent with Ceph and Gluster, for example) to be presented as hardware NVMe devices to VMs, containers, or "bare metal" compute nodes with complete isolation from the distributed storage system. A smart NIC runs only a slightly modified NVMe-oF initiator and will require fewer processing cores than a completely embedded RBD client. Without smart NIC support in the compute node, a NVMe-oF initiator (implemented in a Linux™ kernel, for example) can be modified in the same way and provide the same capabilities, and still provide most of the same isolation of the bare metal nodes from the storage cluster.

Storage servers can benefit from a NIC offload technique similar to the one client devices use to shield them from frequently forwarded I/O requests. This can enable unmodified NVMe-oF initiators to access logical volumes without concentrating their gateway workload on a single storage node processor. The addition of the consistent hashing mechanism enables storage initiators to determine the correct location most of the time for a logical block device region. When a logical block device is assembled from tens or hundreds of 1 gigabyte (GB) or larger allocation units by a distributed volume manager (DVM), the cost of sending I/O to a storage node that has to forward it and send back a location hint is seldomly incurred. A distributed storage system (such as Ceph and Gluster, for example), will assemble their logical block devices from many much smaller segments. In embodiments, the locations of where these segments can be easily determined. Using the consistent hashing hint approach of embodiments of the present invention, forwarding and hinting will only happen while a region is not located where it should be, and only for initiators that do not have the current location hint.

Various embodiments include a storage subsystem; a non-volatile memory express over fabric (NVMe-oF) interconnect; and a host system coupled to the storage subsystem over the NVMe-oF interconnect, the host system to obtain one or more location hints applicable to a range of logical block addresses of a received input/output (I/O) request for the storage subsystem; for each logical block address in the I/O request: apply a most specific location hint of the one or more location hints that matches that logical block address to identify a destination in the storage subsystem for the I/O request; when the most specific location hint is a consistent hash hint, process the consistent hash hint; forward the I/O request to the destination and return a completion status for the I/O request; when a location hint log page has changed, process the location hint log page; and when any location hint refers to NVMe-oF qualified names not included in the immediately preceding query by the discovery service, process the immediately preceding query again.

Various embodiments provide a compute device comprising a redirector device to receive, from an initiator device, a request that identifies a data set to be accessed; determine, from a set of routing rules indicative of target devices associated with data sets, whether the identified data set is available in a storage server associated with the present redirector device; forward, in response to a determination that the identified data set is not available in a storage server associated with the present redirector device, the request to a target device associated with the data set in the routing rules; and send, to the initiator device, an identification of the target device associated with the data set in the routing rules.

According to some embodiments, the redirector device is further to receive, from the target device, an identification of a different target device to which data requests associated with the identified data set are to be sent; and store the identification of the different target device in the routing rules.

According to some embodiments, the redirector device is further to send, to the initiator device, the identification of the different target device.

According to some embodiments, the redirector device is further to receive, from a manager server, default routing rules indicative of predefined target devices to which data access requests are to be sent.

According to some embodiments, to determine, from a set of routing rules indicative of target devices associated with data sets, whether the identified data set is available in a storage server associated with the present redirector device further comprises to select a routing rule from a plurality of routing rules as a function of a specificity of each routing rule associated with the identified data set.

According to some embodiments, to receive, from an initiator device, a request that identifies a data set comprises to receive the request from another redirector device.

According to some embodiments, wherein the redirector device is further to receive data that indicates that a data set that was previously located at a storage server associated with the present redirector device has moved to a different storage server.

According to some embodiments, wherein the redirector device is further to receive data that indicates that a data set that was previously located at one storage server has been moved to a second storage server, wherein the second storage server is associated with the present redirector device.

According to some embodiments, wherein to determine, from a set of routing rules indicative of target devices associated with data sets, whether the identified data set is available in a storage server associated with the present redirector device further comprises to match a compute server that initiated the request with one of multiple target devices identified in the routing rules.

According to some embodiments, wherein to receive, from an initiator device, a request that identifies a data set to be accessed comprises to receive a request to write to the identified data set; and the redirector device is further to forward the request to multiple target devices associated with replicas of the data set.

According to some embodiments, wherein to receive a request that identifies a data set to be accessed comprises to receive a request to access a logical block address.

According to some embodiments, wherein to receive a request that identifies a data set to be accessed comprises to receive a request to access an extent of a volume.

FIG. 1 depicts a data center in which disaggregated resources may cooperatively execute one or more workloads (e.g., applications on behalf of customers) includes multiple pods 110, 120, 130, 140, a pod being or including one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
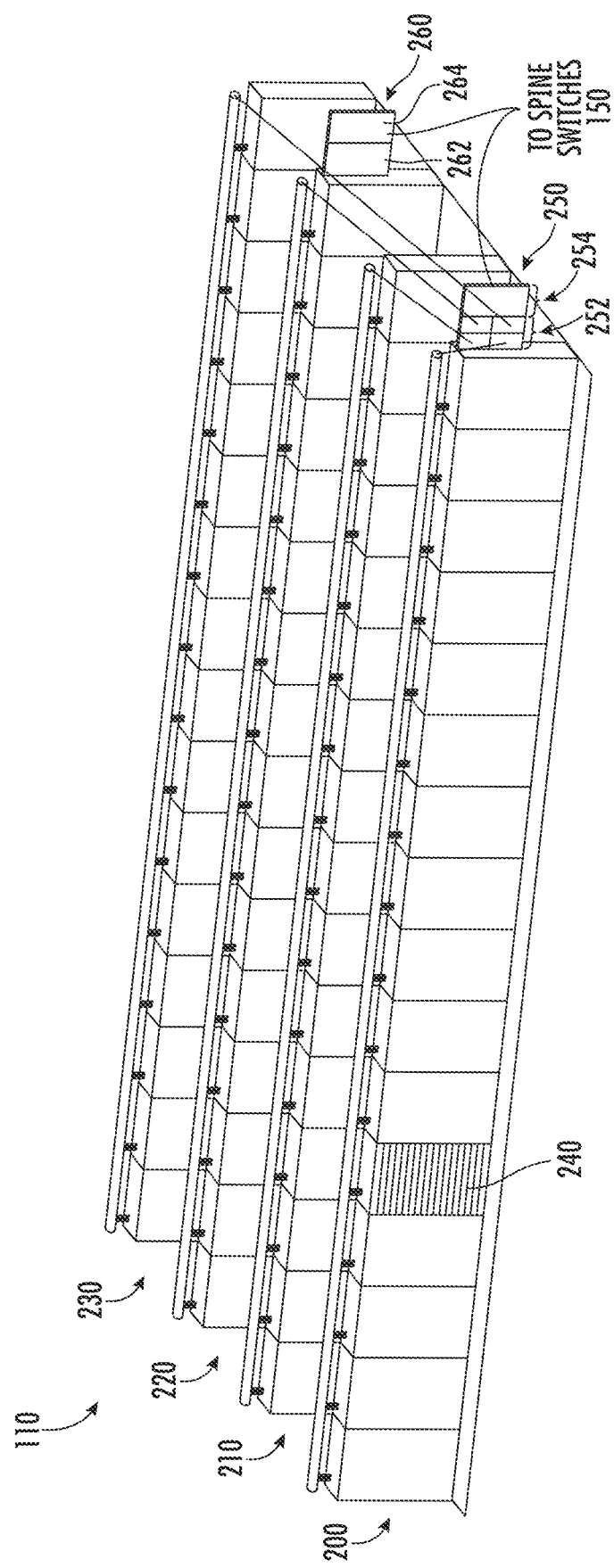
FIG. 2 is a simplified diagram of at least one embodiment of a pod that may be included in a data center.

FIG. 2 depicts a pod. A pod can include a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Peripheral Component Interconnect (PCI) Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
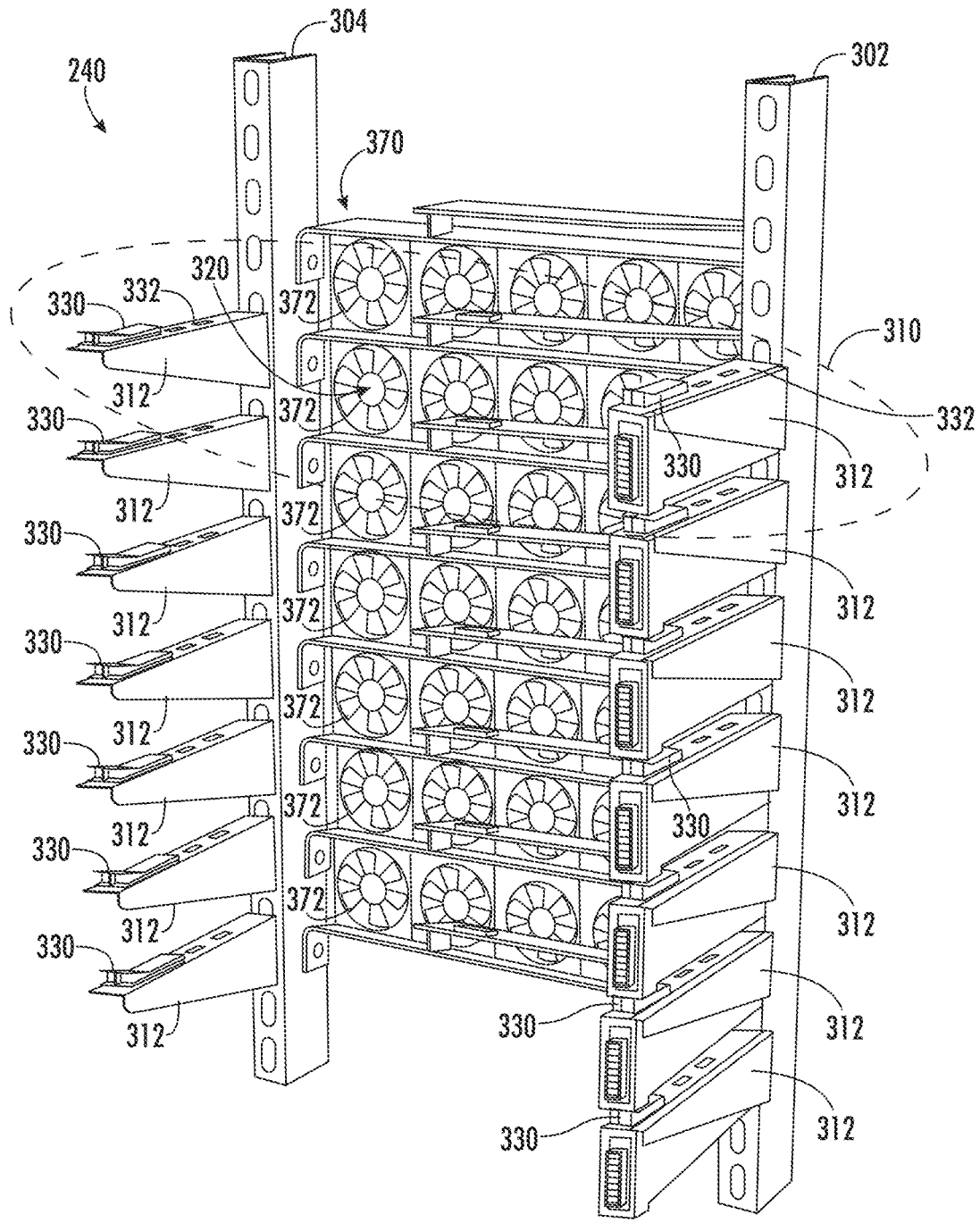
FIG. 3 is a perspective view of at least one embodiment of a rack that may be included in a pod.
Figure 4:
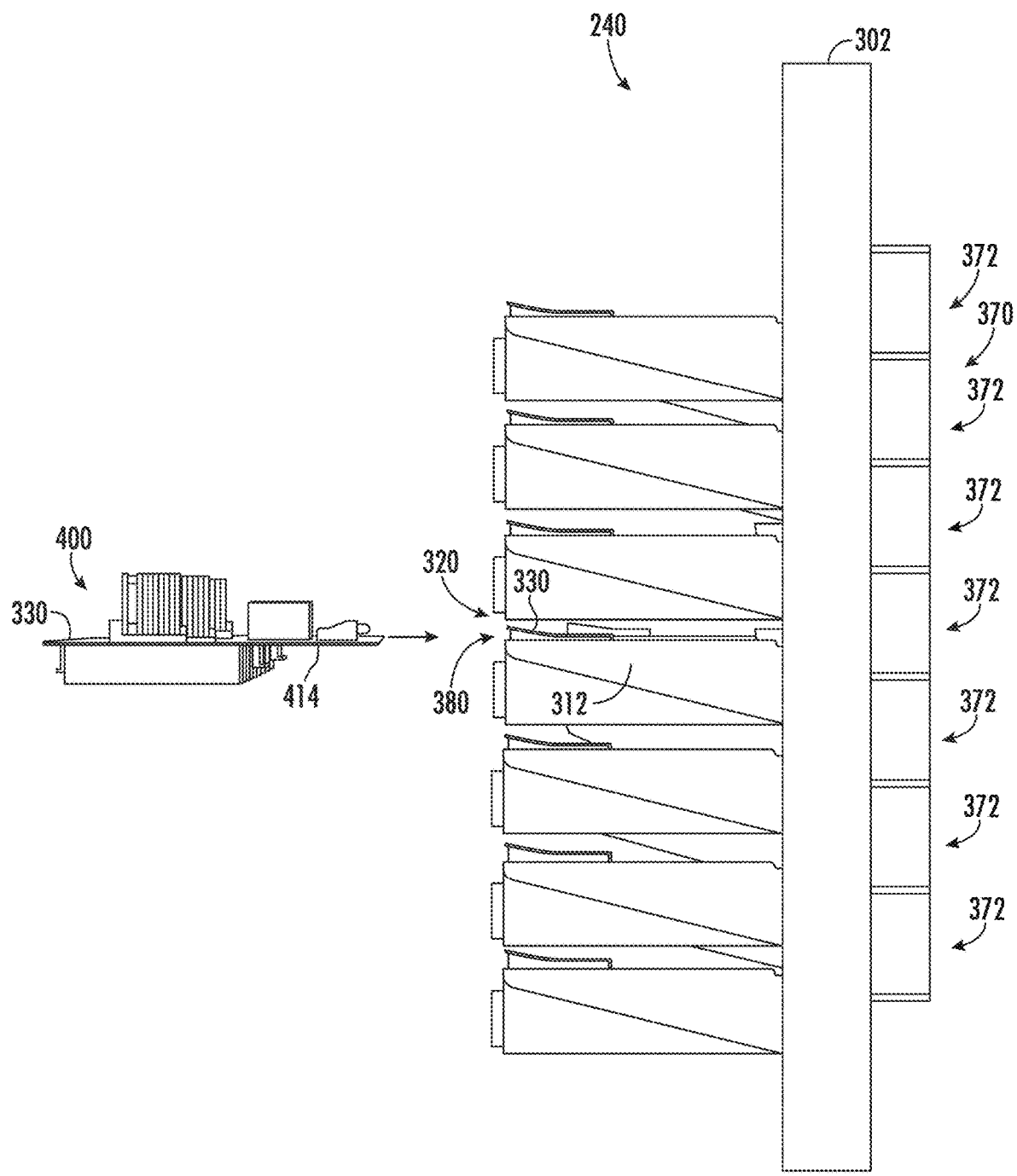
FIG. 4 is a side elevation view of a rack.
Figure 5:
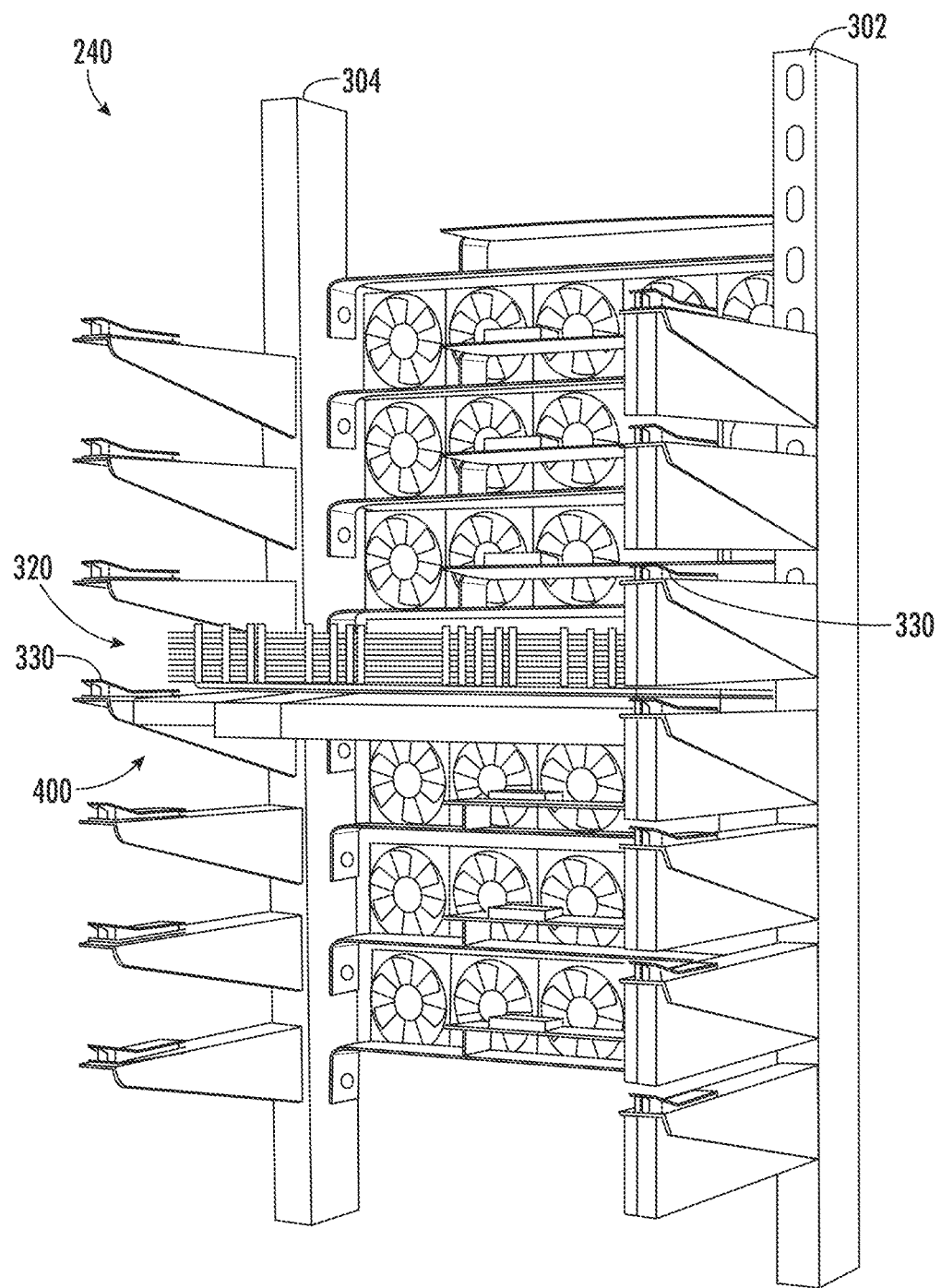
FIG. 5 is a perspective view of a rack having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulatable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
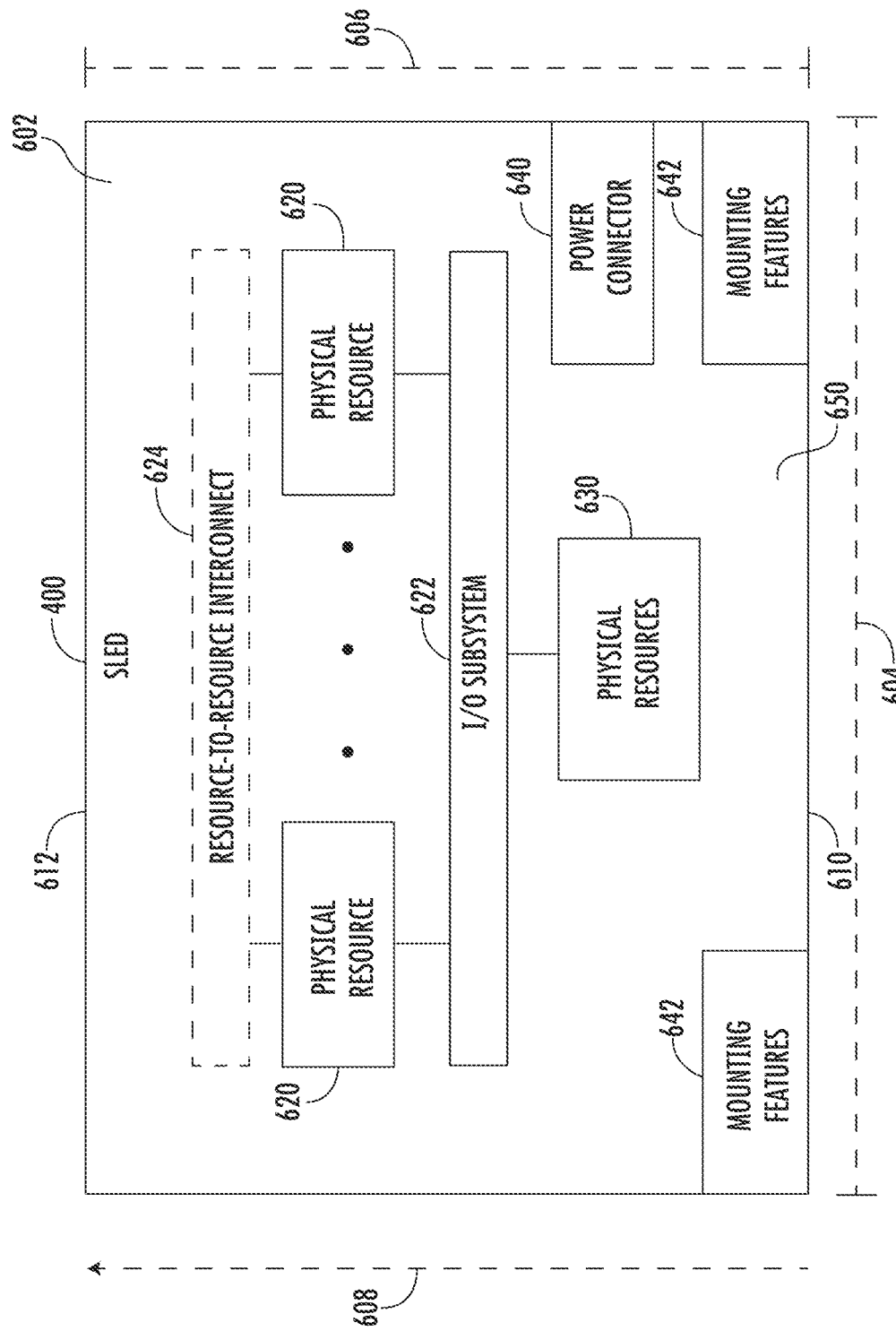
FIG. 6 is a simplified block diagram of at least one embodiment of a top side of a sled.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), PCI express (PCIe), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
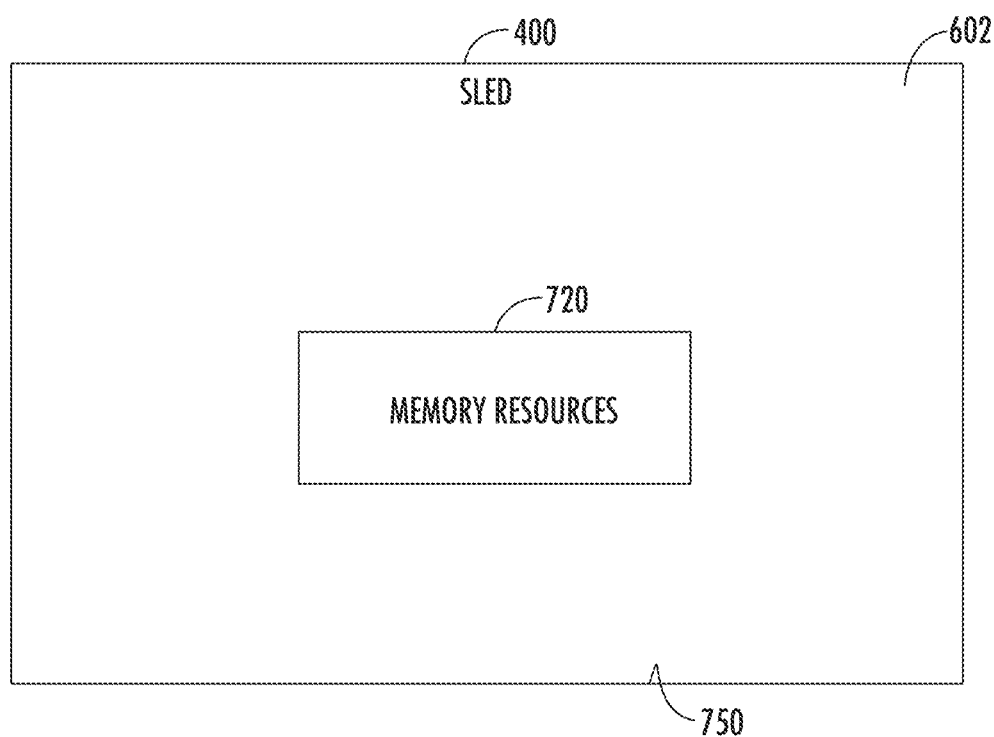
FIG. 7 is a simplified block diagram of at least one embodiment of a bottom side of a sled.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A block can be any size such as but not limited to 2 KB, 4 KB, 8 KB, and so forth. A memory device may also include next-generation nonvolatile devices, such as Intel Optane® memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
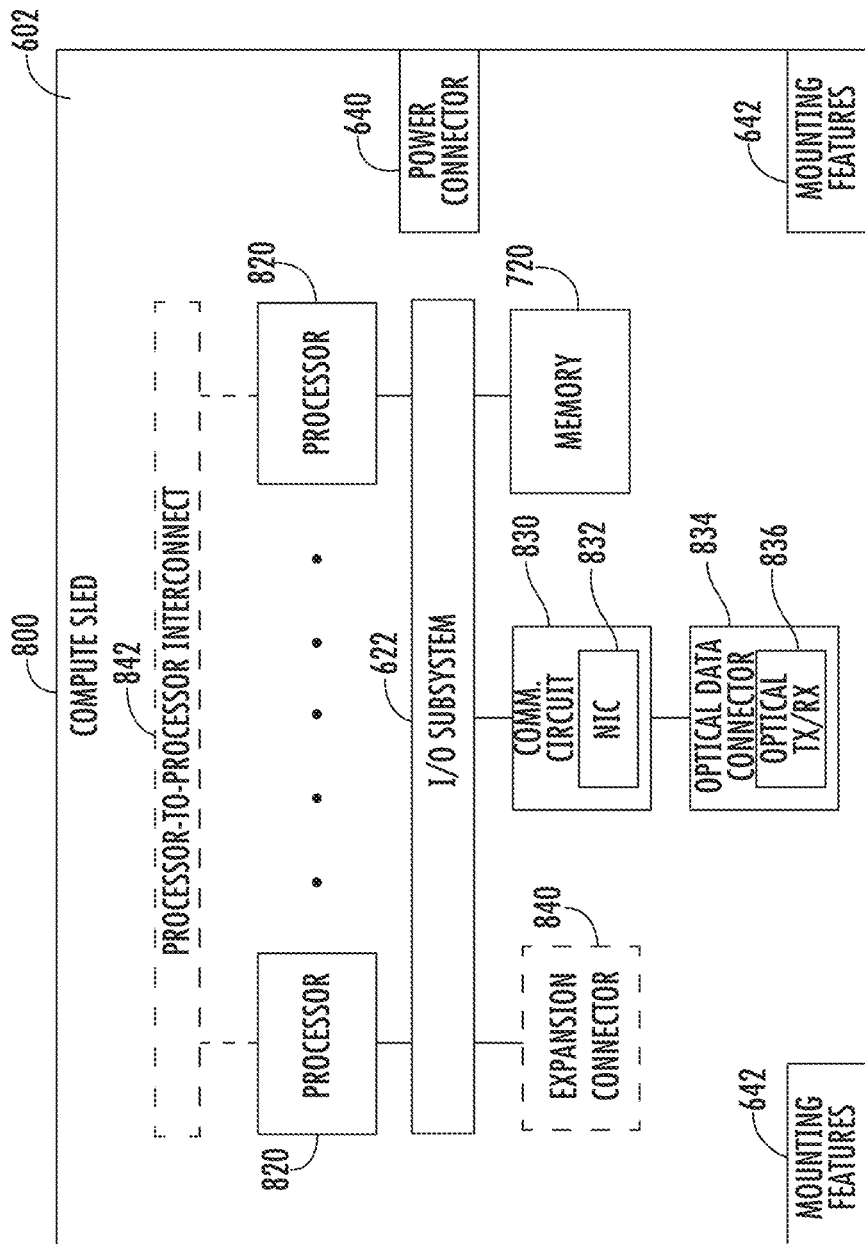
FIG. 8 is a simplified block diagram of at least one embodiment of a compute sled.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications (e.g., PCIe).

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
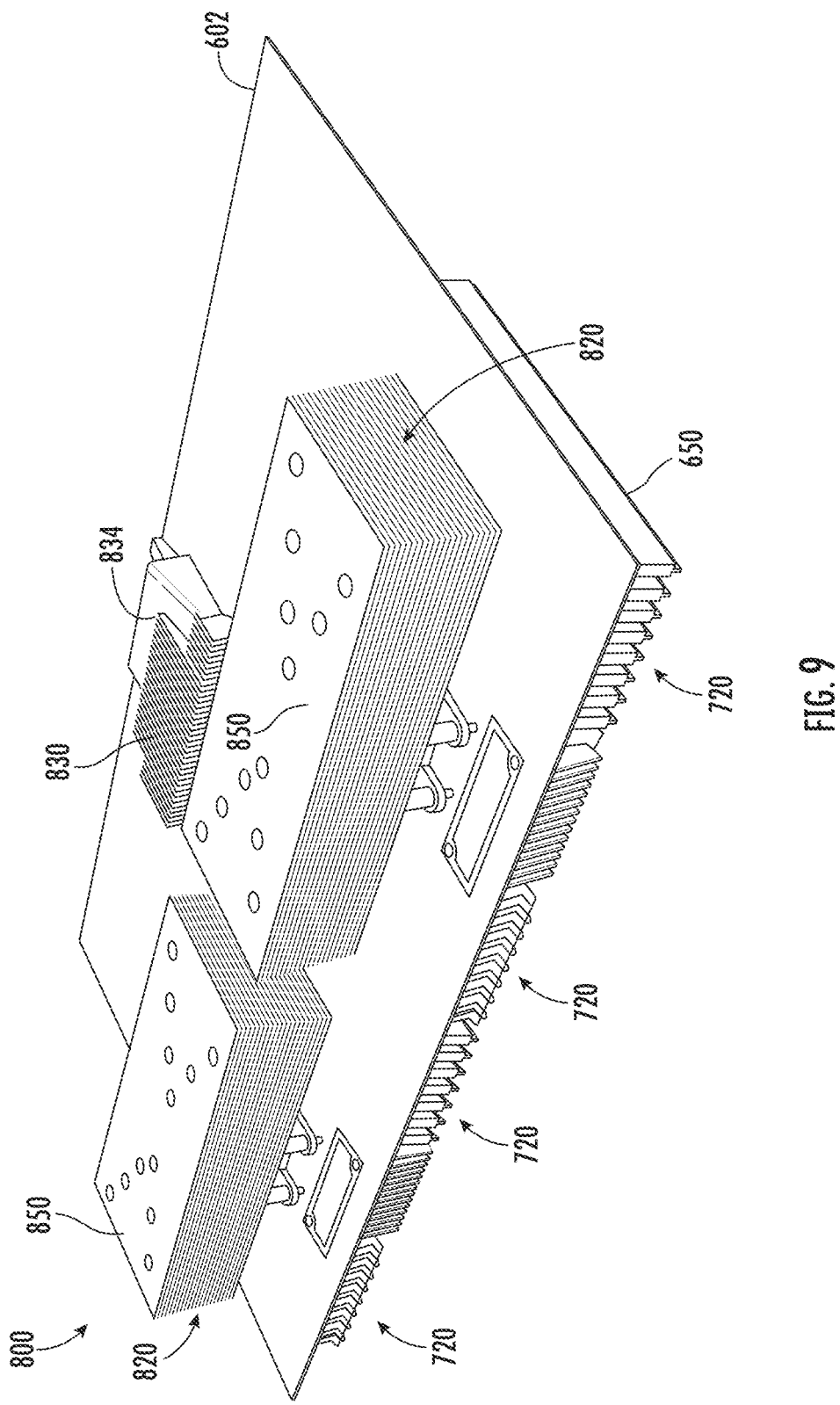
FIG. 9 is a top perspective view of at least one embodiment of a compute sled.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
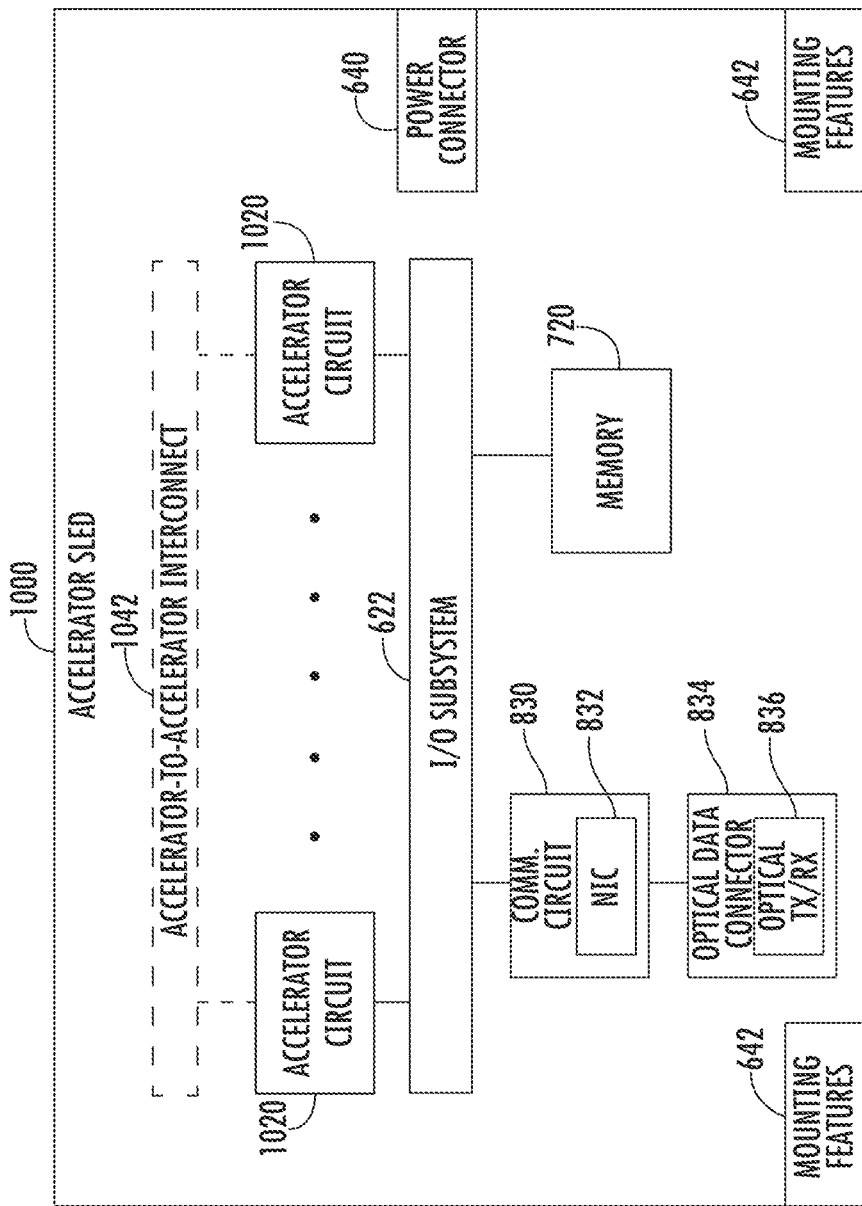
FIG. 10 is a simplified block diagram of at least one embodiment of an accelerator sled usable in a data center.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
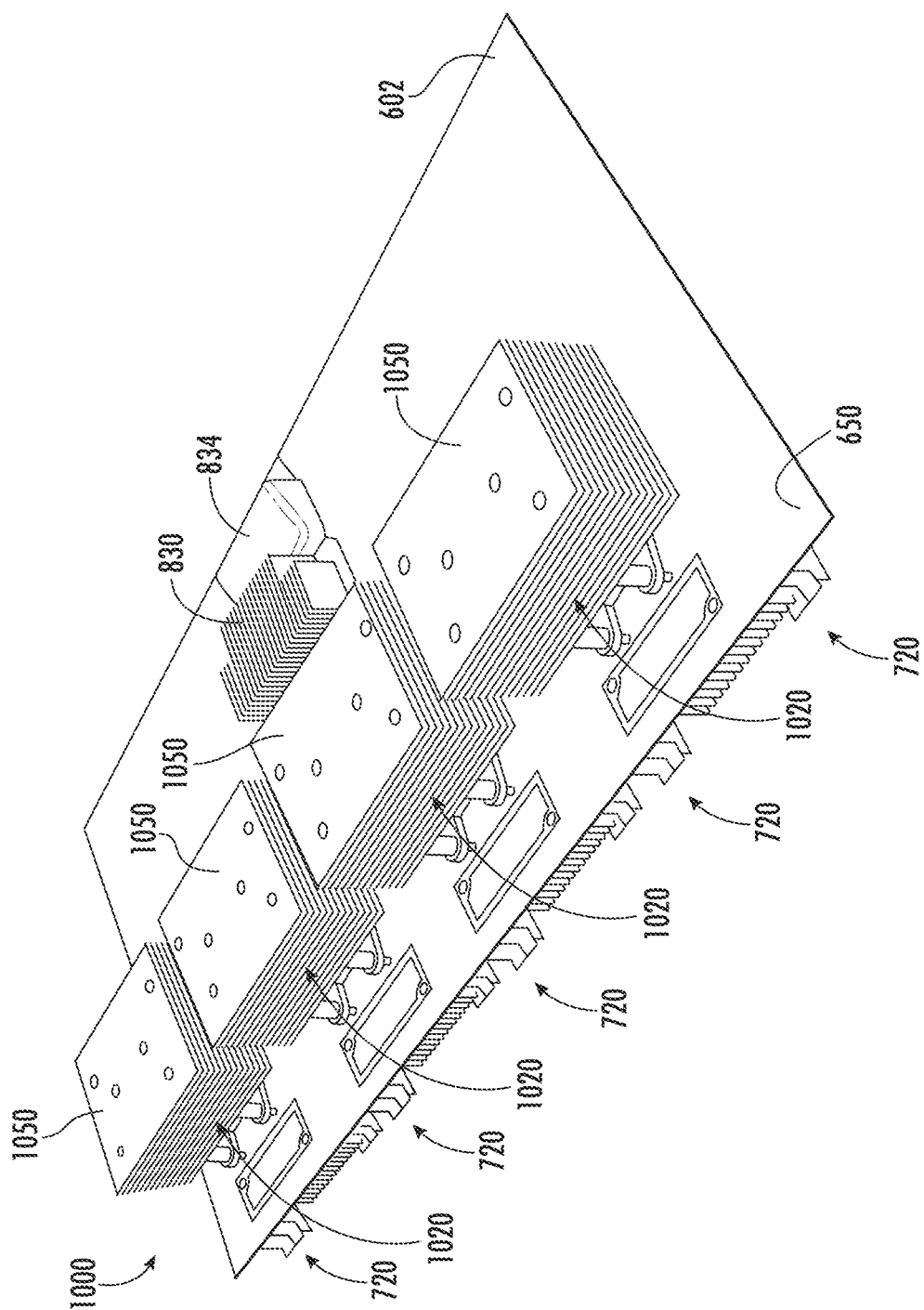
FIG. 11 is a top perspective view of at least one embodiment of an accelerator sled.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
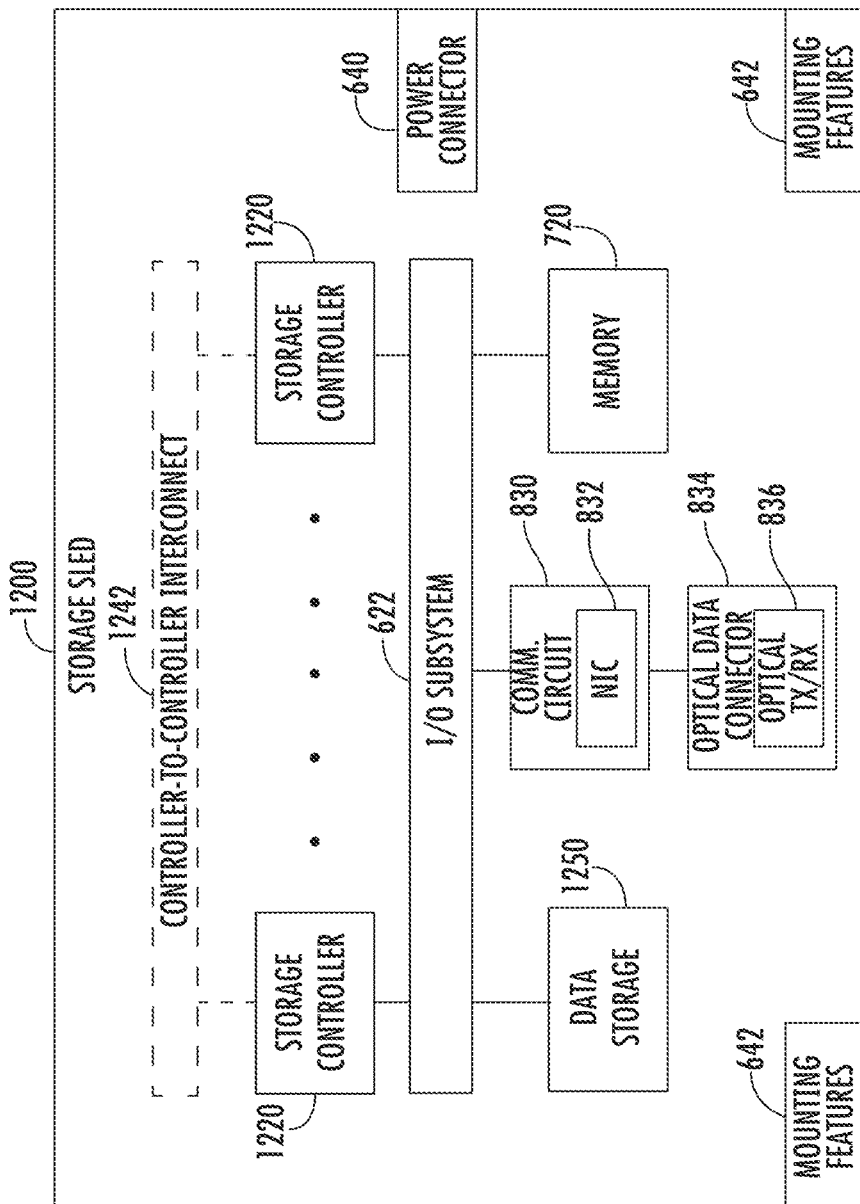
FIG. 12 is a simplified block diagram of at least one embodiment of a storage sled usable in a data center.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above with regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
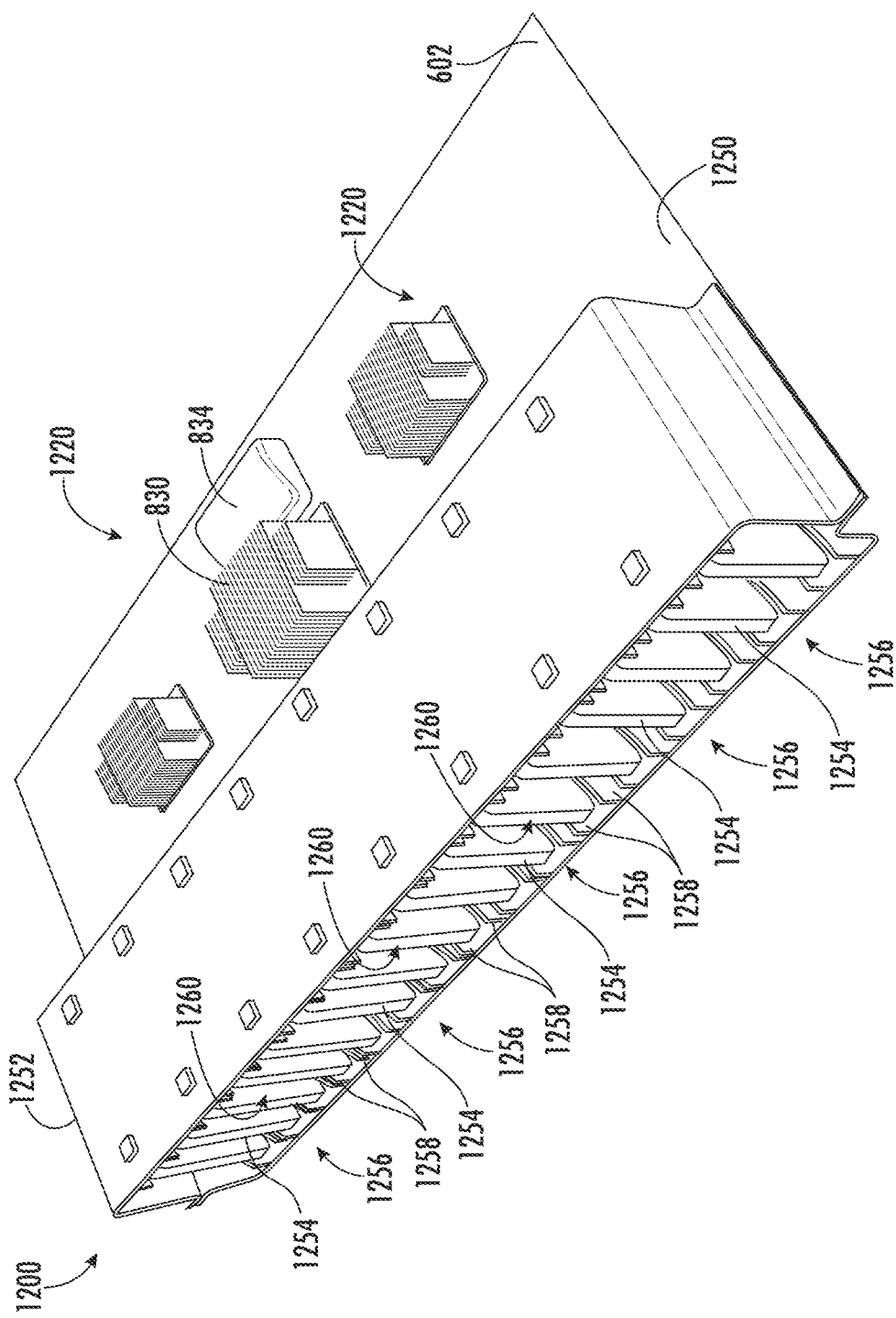
FIG. 13 is a top perspective view of at least one embodiment of a storage sled.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
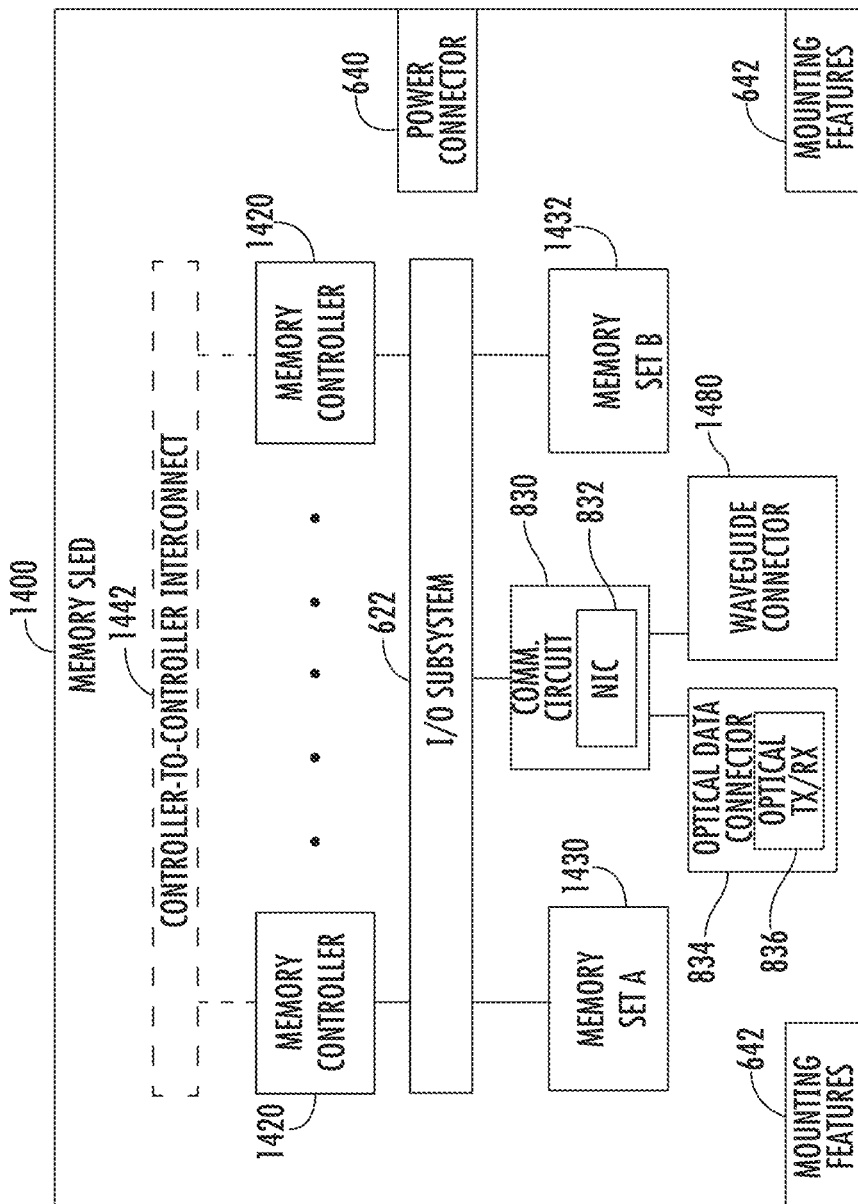
FIG. 14 is a simplified block diagram of at least one embodiment of a memory sled usable in a data center.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from central processing unit (CPU) sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
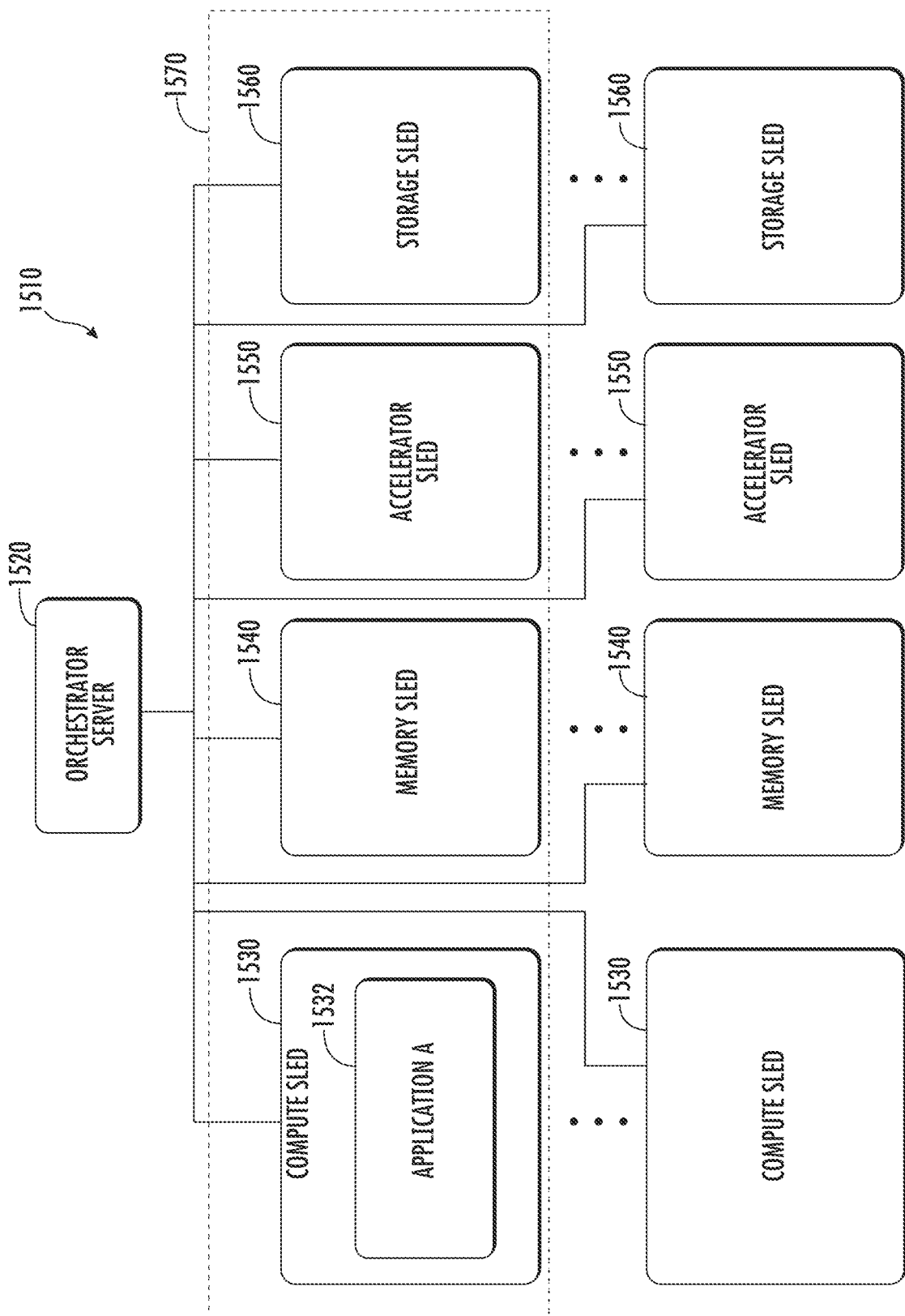
FIG. 15 depicts a system for executing one or more workloads.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., a target throughput, a target latency, a target number instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 1520 may identify patterns in resource utilization phases of the workloads and use the patterns to predict future resource utilization of the workloads.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
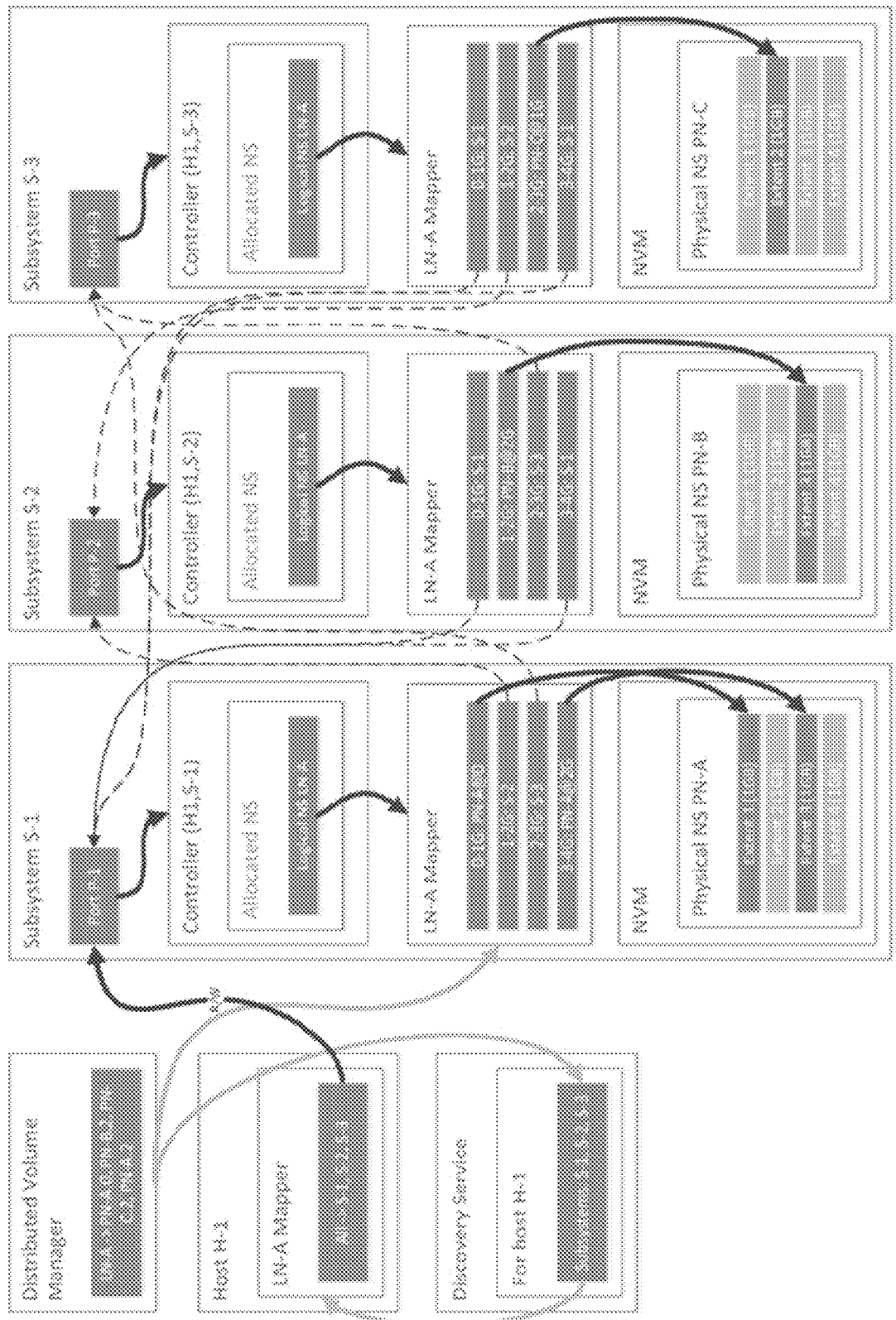
FIG. 16 depicts a system with distributed self-learning NVMe-oF compatible devices, using an abstracted view of an NVMe-oF initiator.

FIG. 16 depicts a system with distributed learning of NVMe-oF compatible devices, using an abstracted view of an NVMe-oF initiator. Host H-1 accesses LN-A (logical NVMe namespace A). The DVM has concatenated four 1 GB extents of three different physical NVMe namespaces (PNs) to form 4 GB logical namespace LN-A. The extents are: 0-1 GB of PN-A in subsystem S-1, 2-3 GB of PN-B in subsystem S-2, 1-2 GB of PN-C in subsystem S-3, and 2-3G of PN-A in subsystem S-1.

This is a general distributed volume manager (DVM) use case, where LNs are allocated fluidly from free regions of PNs. Here, the PN extents are all the same size. A DVM is free to allocate extents of any size. When adjacent extents of the LN are on the same subsystem, a single location hint spanning their logical block address (LBA) range can be used.

In this example, host H-1 contacts the discovery service (DS), retrieves the list of subsystems, and connects to subsystems S-1, S-2, and S-3. Host H-1 discovers that these are all redirectors, and all provide LN-A. At that point, H-1 has three default targets for all IO to all LBAs of LN-A. All targets are equally preferred because so far there have been no location hints expressing any priority of the alternatives. In this case, they all refer to both reads and writes, and they all refer to the various 1 GB extents of LN-A.

In this example, each subsystem could send H-1 initial hints about the extents it owns. Host H-1 would then have a complete map of LN-A at initialization, and may never send an IO that gets forwarded. However, in some cases, this approach may not be scaled beyond a hundred extents.

The DVM is responsible for maintaining the mapping of LN-A to its component PN extents, and for initializing the mappers in each subsystem with entries for the extents it owns. The DVM also initializes the mappers in each subsystem so IO to any LBA can be completed by any of them by populating each mapper with a complete map of all 4 extents of LN-A.

Figure 17:
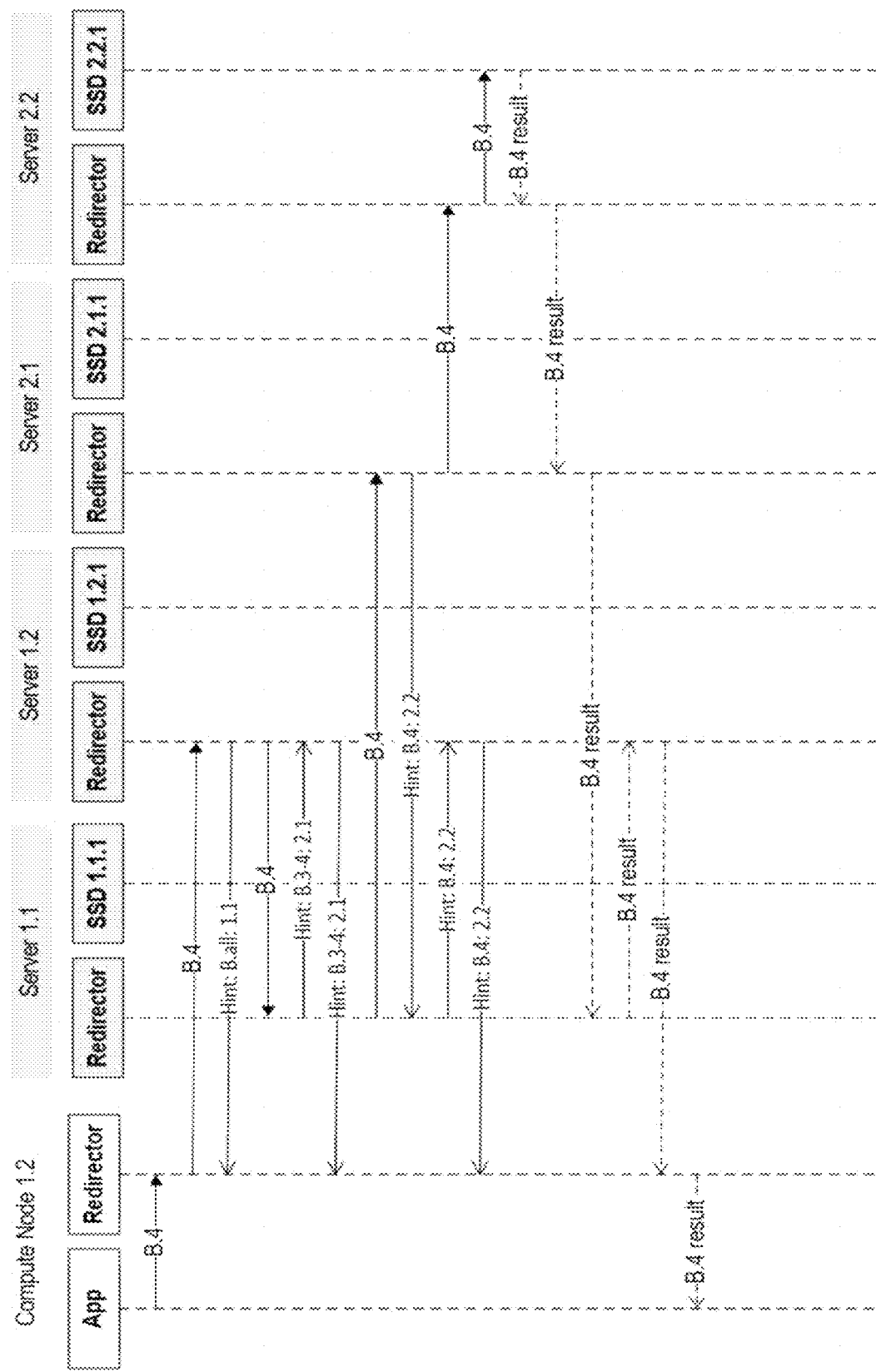

FIG. 17 depicts a process flow for access of a remote storage node using NVMe-oF. An approach provides a redirector and hints about which remote storage server a block should be read/written from/to. A host sends first input output (TO) (e.g., read or write) and then learns where other IOs should go. The host (compute node 1.2) learns complete knowledge of where a block is stored within a few IOs. The host computing system executes a NVMe-oF initiator software that finds one or more NVMe-oF subsystems and connects to all of them to find an NVMe namespace. Namespaces are large global unique identifiers. The initiator receives hints to know where ranges are located. A log page can be used to identify locations of devices that store content associated with logical addresses.

An approach provides a redirector device to receive, from an initiator device, a request that identifies a data set to be accessed. The redirector device is also to determine, from a set of routing rules indicative of target devices associated with data sets, whether the identified data set is available in a storage server (e.g., SSD) associated with the present redirector device, forward, in response to a determination that the identified data set is not available in a storage server associated with the present redirector device, the request to a target device associated with the data set in the routing rules, and send, to the initiator device, an identification of the target device associated with the data set in the routing rules.

Various embodiments provide for offloading of storage scale-out management to a network interface card (NIC) or SmartNIC with an NVMe-oF initiator. The NVMe-oF initiator can be implemented in hardware and/or software by the NIC. Various embodiments reduce central processing unit (CPU) utilization of an integrated system on chip (SoC) in a NIC and provide a scale-out solution for the NVMe-oF initiator in a NIC in cloud or fabric environments. By contrast, a scale-out solution based on NVMe-oF software-implemented initiator in a host computing platform can introduce higher CPU utilization because of the overheads of hashing algorithms and hint processing and can introduce additional latency because of software-based flows. Scale-out can refer to addition of additional resources (e.g., compute, memory, or storage) based on accessible addition of resources to a network or fabric instead of increasing capacity of existing resources. For a smart NIC with hardware based NVMe-oF initiator, for bare metal hosting usages, offload of the hashing algorithms and hints processing to the processing pipelines can be beneficial because the integrated SoC (in SmartNIC) has a limited compute capacity. A bare metal server can be a physical server device allocated for use to a single tenant or customer. The tenant can configure the server according to its needs for performance, security and reliability. An alternative to a bare metal server is a hypervisor server, where multiple users share a virtual server's compute, storage and other resources. However, embodiments can be used for hypervisor servers or non-bare metal use cases.

In some embodiments, a NIC can take a variety of parameters and hints (e.g., messages) and then use lookup tables to find the remote storage system for each storage block (LBA) address. The control plane software executing on the integrated SoC of the NIC can, at run-time, update the lookup tables and parameters/hints to the scale-out scheme. Various embodiments provide software assisted translation of hashing hints into a hint table lookup and provides flexibility of adjusting input sets to the hashing algorithm in different deployment scenarios. Various embodiments also reduce latency and/or jitter (e.g., variation in response), which are important metrics for storage applications. Note that reference to storage can also refer to volatile memory and reference to memory can refer to non-volatile storage or non-volatile memory including byte-addressable memory.

On reboot, a host might erase or discard hints. Various embodiments store hints on smart NIC that may retain hints independent of the host.

Figure 18:
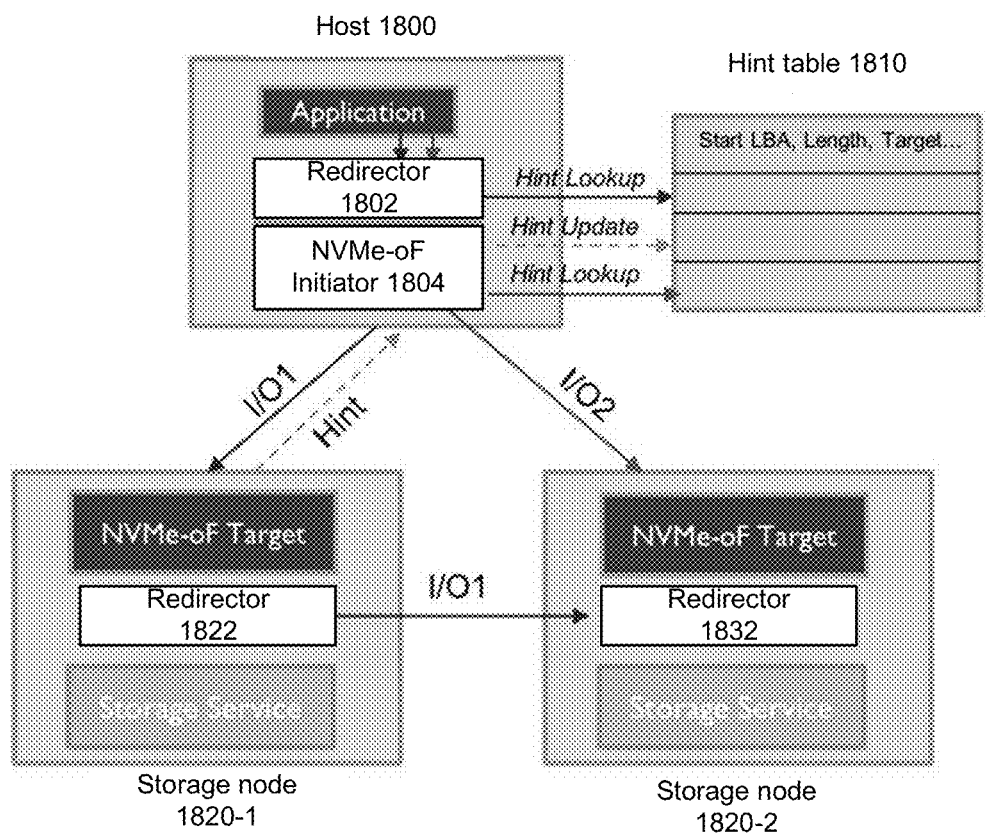
FIG. 18 depicts an example system.

FIG. 18 depicts an example system. The system can use offload redirector 1802, NVMe-oF initiator 1804 and hint table 1810 to a NIC, Smart NIC, switch, or buffer. Redirector 1802 directs 110 requests from an application run by a host computing system to the correct NVMe-oF target based on hint table 1810. Target redirector 1822 forwards 110 to the correct storage node and propagates hints backward and forward, allowing fully decoupled and legacy clients. Redirector 1802 updates local hint table based on received hints about a volume. Redirector 1802 eventually is updated with an NVMe-oF volume distribution across nodes by use of hints.

The hints allow flexible mapping of logical block address (LBA) to one or more storage nodes connected to host 1800 through a connection such as a fabric, network, interconnect or bus. For example, simple hints, striping hints, or hashing hints (described herein) can be supported. Hints can enable a NIC to support NVMe-oF storage services ranging from pair-wise High Availability (HA) to massive scale-out. In this example, a host sends I/O1 to storage node 1820-1 but storage node 1820-1 cannot fulfill I/O1 as it does not have the associated LBA. Redirector 1822 transfers I/O2 to storage node 1820-2 to fulfill the transaction. Storage node 1820-1 transmits a hint to host 1800 to identify I/O1 is stored in storage node 1820-2. Redirector 1802 updates hint table 1810 with the node address of I/O2 for a starting LBA associated with the I/O2. In another transaction for an LBA identified using I/O2, the host sends I/O2 directly to storage node 1820-2.

Figure 19A:
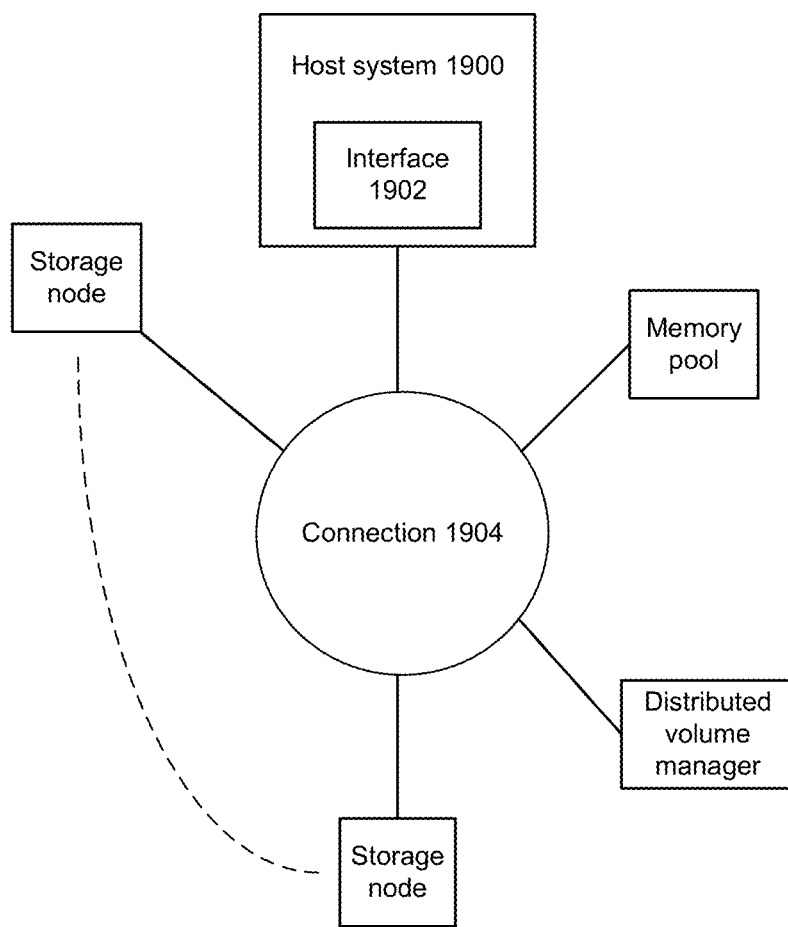
FIG. 19A depicts an example system.

FIG. 19A depicts an example system. A host system 1900 using interface 1902 can be connected to storage nodes, memory pools, accelerators, a distributed volume manager, and other devices using connection 1904. Interface 1902 can use various embodiments to identify an address of a storage device to which a memory access request is to be transmitted. Connection 1904 can provide communications using one or more of a bus, interconnect, fabric, or network compatible or compliant with one or more of: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Figure 19B:
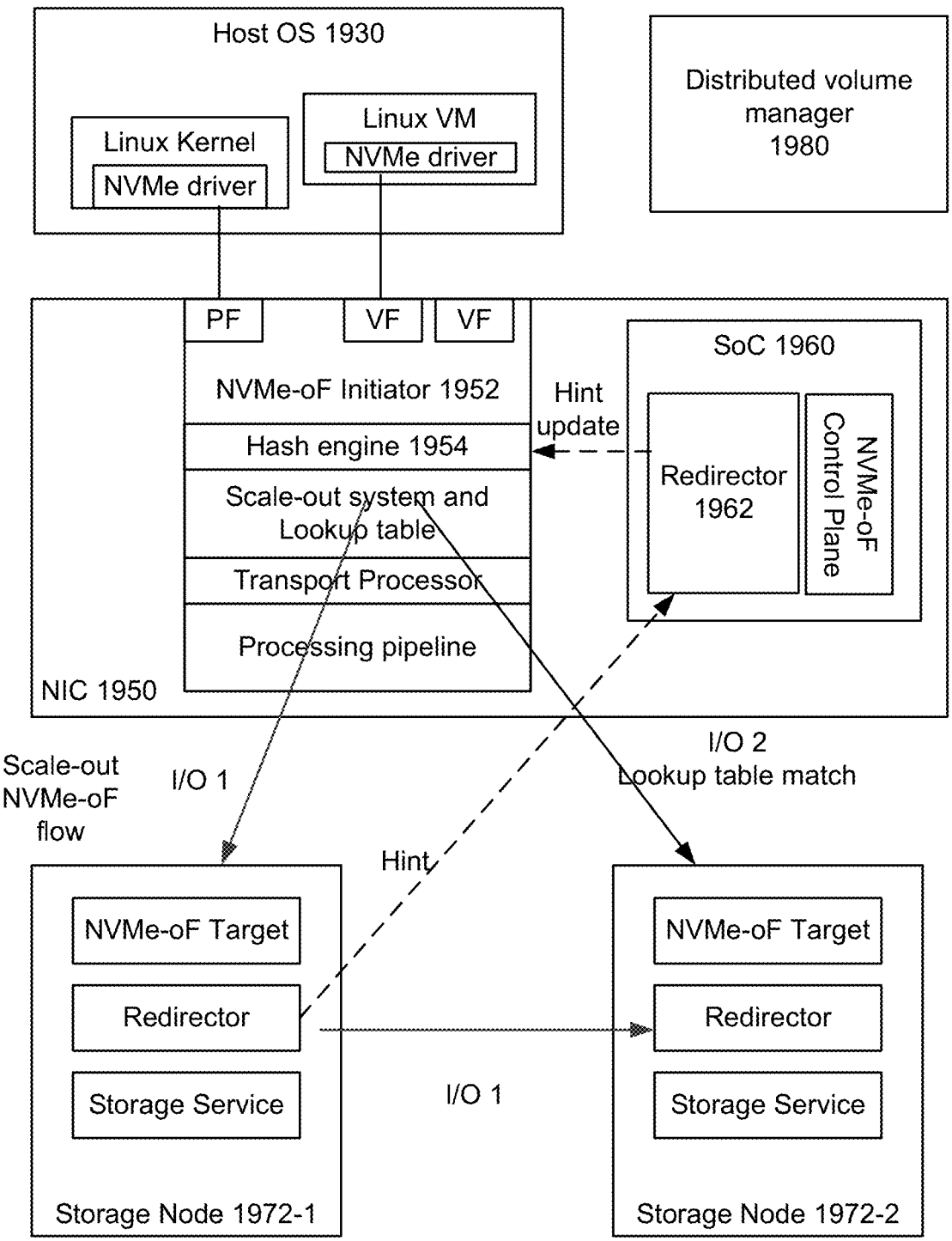
FIG. 19B depicts an example system.

FIG. 19B depicts an example system. Various embodiments offload I/O redirect management into NIC 1950 (e.g., a SmartNIC) rather than host system. Note that NIC and SmartNIC can be used interchangeably. The initiator and redirector can be offloaded into the NIC 1950 pipeline for a high-performance design and for bare-metal hosting usages.

Host system can execute an operating system (OS) 1930. OS 1930 can access one or more NVMe drivers using a kernel, or virtualized execution environment to access a Virtual Function (VF) or Physical Function (PF). VF can represent a virtual NVMe function. For example, (VF) can use single root input/output virtualization (SR-IOV) or Scalable I/O Virtualization (SIOV). PF can represent a physical NIC function.

A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include access of memory by a particular container but not another container. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

NIC 1950 can provide NVMe-oF initiator 1952 as available for use by a host system. NVMe-oF initiator 1952 can be implemented in hardware and support scale-out system and table lookup. Lookup tables can stored in on-die static random access memory (SRAM) or implemented as a cache in SRAM backed by DDR memory. The lookup table size can be large enough to support many volumes and a large range of LBAs. A scale-out hint table lookup can be implemented in any combination of hardware or software and enables a full hardware-based data flow in scale-out deployment, avoids runtime software-based table lookup and thus reduces CPU utilization on the SoC 1960 that is integrated into NIC 1950. A mixed hardware and software implementation can reduce latency and jitters, which are important metrics for storage applications, especially for remote solid state drives (SSDs) or memory devices accessed over NVMe-oF.

Redirector 1962 can be software executed by a processor. NVMe-oF initiator 1952 can hand off I/Os to redirector 1962 in certain cases such as, but not limited to: failure of a QP, any other failure of a forwarded I/O, LBA ranges not covered by the lookup table (e.g., because the table is not large enough), and I/Os that are to be fragmented (e.g., because the QP for their starting LBA is different from the QP of their last LBA, or because they are too large for the target QP).

Initiator 1952 can keep statistics (e.g., counts) of a number of times a hint table entry is used, so redirector 1962 can determine what to evict from the table.

SoC 1960 can be used to perform correction of various error or flagged conditions such as identified QP of a command is inoperative or down, no mapping table entry for an IO. SoC 1960 can inform host system of an error if SoC 1960 is unable to correct the error and the host system can attempt to correct the error.

An example operation of the system of FIG. 19B can be as follows. At 1, NVMe driver from the host sends an I/O command to a VF exposed by the SmartNIC. At 2, the I/O command is processed by NVMe-oF initiator 1952, which moves data into local buffers if it is a write command. For an I/O command to a device coupled using a fabric or network, initiator 1952 translates the NVMe command into an NVMe-oF command. At 3, initiator 1952 retrieves (PF/VF number, Namespace ID, LBA number) from the I/O command context. At 4, initiator 1952 applies scale-out by performing a hint table lookup to find an RDMA QP to use to send the NVMe-oF command. If there is a match in the table between the I/O command context and an entry in the table, retrieval takes place of the RDMA QP used to send the NVMe-oF command. If there is no match, a default RDMA QP (e.g., a default storage node) is used to send the NVMe-oF command or the command is sent to SoC software for processing. At 6, the target storage node 1972-1 receives the IO command (I/O1). If the LBA is not in the range of target storage node 1972-1, the target storage node 1972-1 forwards the IO command to the next best target node (e.g., specified by DVM for this target storage node) (e.g., node 1972-2), and sends the latest hint (the one it used to make the "next best target" decision) to the NIC 1950.

At 7, initiator 1952 in NIC 1950 receives the latest hint from target node 1972-1. Redirector 1962 processes the hint, translates the hint into a simple lookup entry, and updates the lookup table with the latest hint. At 8, for the next IO command from the same VF/NSID (namespace identifier), a table match will be hit in the table and an NVMe QP is retrieved from the matched table entry. NVMe-oF command (1102) is sent to the correct target node 1972-2 using the shortest network path instead of being sent to a storage node 1972-1, which forwards the I/O request, directly or indirectly, to the destination node 1972-2.

The following provides an example format of entries in a lookup table used by initiator 1952.

| Logical namespace | Hints Type (Simple, Striping, Hashing) | LBA Range (for simple hint)/Stripe size (for striping hint)/ Object Size for hashing | I/O Direction (Read (R), Write (W) or RW) | Output (RDMA OP or connection ID) |
|---|---|---|---|---|
| (PF0, VF1, NSID1) | Simple | [0, 1023] | RW | QP1 |
| (PF0, VF1, NSID1) | Simple | [1024, 2047] | RW | QP2 |
| (PF0, VF2, NSID2) | Striping | 1024 | RW | [QP3, QP4, QP5] |
| (PF0, VF2, NSID2) | Simple | [0, 1023] | RW | QP3 |
| (PF0, VF3, NSID3) | Hash | 4096 | RW | NA (follow hash lookup table flow) |
| ... | | | | |

Note (PF#, VF#, SQ#, NSID#) can be replaced by pNSID, which is a unique namespace ID after remapping the NSID from the host command into an internal unique number.

NIC 1950 can use SoC 1960 to provide NVMe-OF control plane and a software (SW) implemented redirector 1962. Redirector 1962 running on SoC 1960's processor can process hints from remote storage nodes or a distributed volume manager and update the lookup tables of initiator 1952. In some examples, redirector 1962 can support various one or more of: simple hint, striping hint, or hashing hint. A simple hint is used for a small namespace and small number of QPs. A simple hint includes fields [Start LBA, Length, Read/Write, Target Extent List]. For example, LBA0-X range goes to server0 (represented as any or more of RDMA queue pair, Transmission Control Protocol (TCP), Quick User Datagram Protocol Internet Connections (QUIC), whereas LBA-Y-Z range goes to server1 (represented as any or more of RDMA queue pair, TCP, QUIC).

A striping hint can be used for data to be reliably distributed and provides higher aggregated I/O operations (IOPs) across multiple servers. A striping hint can include fields [Start/End LBA, Stripe Size, Number of Extents, Target Extent List]. An LBA range can be striped over extents. A striping hint can be transformed to LBAs to stripe data across multiple servers. For example, LBA0 is assigned to server0 LBA1 is assigned to server1, and so forth.

Figure 21:
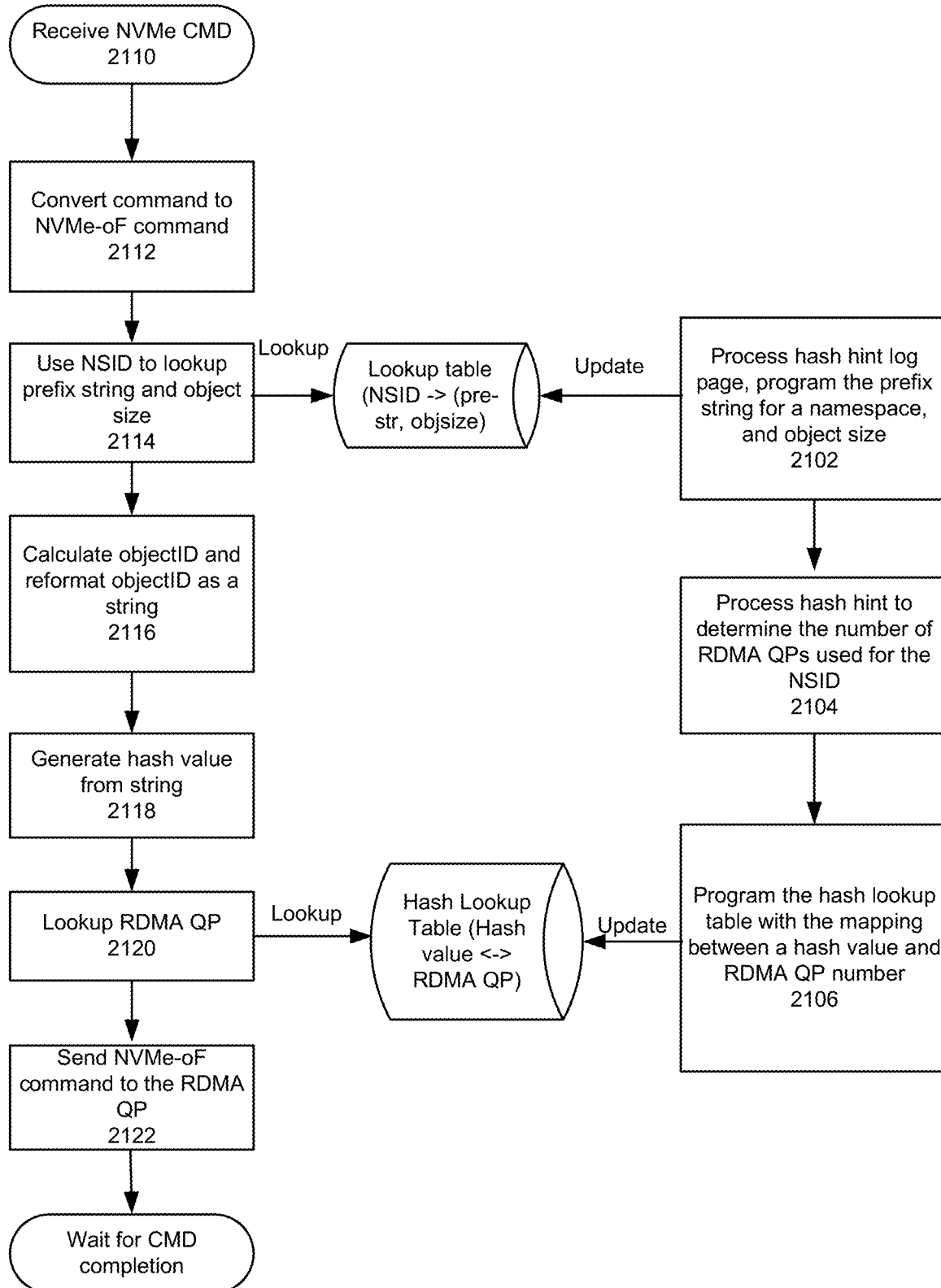
FIG. 21 depicts a process to process hashing hints.

For example, hashing hints are described at least with respect to FIG. 21. Hashing Hint can include fields [Object Size, Object Name Format, Hash Function, Hash Table Page]. Hashing hints can be used for scale-out storage or memory nodes to expand the number of available addressable nodes.

The following provides example definitions of hints used in distributed storage network.

Simple Hint over the Distributed Storage Network.

| Field | | Description |
|---|---|---|
| LN Start LBA | | '0' in both for "all LBAs" |
| LN End LBA | | |
| I/O direction | | R, W, or both |
| Multiple location policy | | One of:<br>"Order indicates preference",<br>"client RR",<br>"client chooses" |
| Locations | | If >1 location supplied, apply multiple location policy above |
| Location 1 | Subsystem NQN | One of the subsystems identified by the DS |
| | Destination NGUID (optional) | Usually the same as the LN NGUID |
| | Offset | The same as 'Start LBA' |
| | Locations 2-n | Repeats for as many locations as there are |

Stripe Hint over the Distributed Storage Network

| Field | | Description |
|---|---|---|
| LN Start LBA | | Offset in LN of this stripe group |
| LN stripe size | | Bytes per stripe (or stripe number bitmask) |
| Stripe extent count | | PN extents per stripe group (or extent number bitmask) |
| Stripe group members | | Array of length "Stripe extent count" |
| Extent 1 | Subsystem NQN | One of the subsystems identified by the DS |
| | Destination NGUID (optional) | Usually the same as the LN NGUID |
| | Offset | The same as 'Start LBA' |
| | Extents 2-n | Repeats for as many extents as there are |

The destination NGUID can be removed from some or all hints in some embodiments. Removing the destination NGUID can save 128 bits per hint for use cases that do not use it. The destination NGUID can be used if a NIC has attached NVMe drives, a hyperconverged storage use case, where the SSDs are all located in compute nodes, and the DVM is distributed across the smart NICs. Another use case for destination NGUID is handling Ceph RBD clones. A Ceph RBD clone can be layers of RBD volumes each containing only the blocks that are different from their parent, and where each layer in the clone stack needs a different consistent hash hint because its objects have a different name prefix, and possibly a different PG table which may share no OSDs at all with the child because the child was cloned into a different OSD pool.

Hashing Hint Over the Distributed Storage Network

| Field | Example Description |
|---|---|
| LN chunk size | Bytes per object |
| Chunk name format string | Leading and trailing portion of object name, and format specifier for the chunk number. |
| Hash function | Code for one of the pre-defined hash functions |

-continued

| Field | Example Description |
|---|---|
| Hash bucket count | Size of location table indexed by hash |
| Hash table log page | Log page containing the location table |

Various embodiments discussed herein can be combined with software assisted processing of a hashing hint. Hash-based look up of storage nodes can be used for cloud storage systems such as Ceph or Gluster. SoC-executed software (e.g., redirector 1962) can process the hashing hint by performing a hash calculation, translating the hashing hint into a simple hint (e.g., LBA range to RDMA QP) and programming the lookup table used by initiator 1952. In some examples, redirector 1962 or initiator 1952 can include or use a hashing engine to offload the hashing calculation. Initiator 1952 can perform inline hashing processing and use the hash value to lookup an RDMA queue pair (QP) number to avoid software processing of an NVMe-oF command. Of course, any combination of hardware and/or software can be used by all embodiments described herein.

In some examples, initiator 1952 can use hardware to implement an R. Jenkins compatible hash engine 1954 and processor-executed software to program prefix string for a namespace (pre-str) and object size. Other hash schemes can be used such as Toeplitz hash, XOR calculation, SHA256, and so forth. The system can use hardware and/or software to perform lookup (NSID→(pre-str, object size)) to obtain pre-str and object size for an NSID specified in a received NVMe command. Initiator 1952 can use hardware to calculate objectID number based on LBA# and object size. For example, the system can determine objectID=(LBA# *sector size/object size), where a page size can be 4 KB and object size can be 4 MB. Initiator 1952 can use hardware to reformat objectID to a string (obj-str) and concatenate with the prefix string for a namespace to produce "pre-str.objstr". A maximum length of an object name string can be very long for objects using REST gateway for RADOS object (RADOSGW) or object storage service. Block device-based usage (RBD image names) can be shorter.

In some examples, initiator 1952 can support a maximum length, e.g., 256B of object name string. The system can use processor-executed software in SoC 1960 or host to handle the exceptions that exceed this maximum length.

RDMA QP lookup can include use of hash engine 1954 at least in the following manner. Hash engine 1954 can receive an input (pre-str.objstr, length) and generate hash_value. The hash value can further be updated by a simple stable "mod" function that is used in Ceph CRUSH algorithm. The system can use a lookup table with input of hash_value % lookup_table_size and output of RDMA QP# or other identifier of a node or device (physical or virtual) to send a storage or memory access request to. A memory access request can be a write, a read, a command, status request, and so forth.

Distributed volume manager 1980 can track mapping of LBAs-to-storage node address for storage or memory nodes that are connected to the host system and participate in storage or memory scale-out. Distributed volume manager 1980 can program the redirector 1962 with an updated hint table and/or mapping of LBAs-to-storage node address. Distributed volume manager 1980 can be implemented in the same server as that of the NIC, same rack as that of the NIC, a POD manager, or a connected device.

Figure 20:
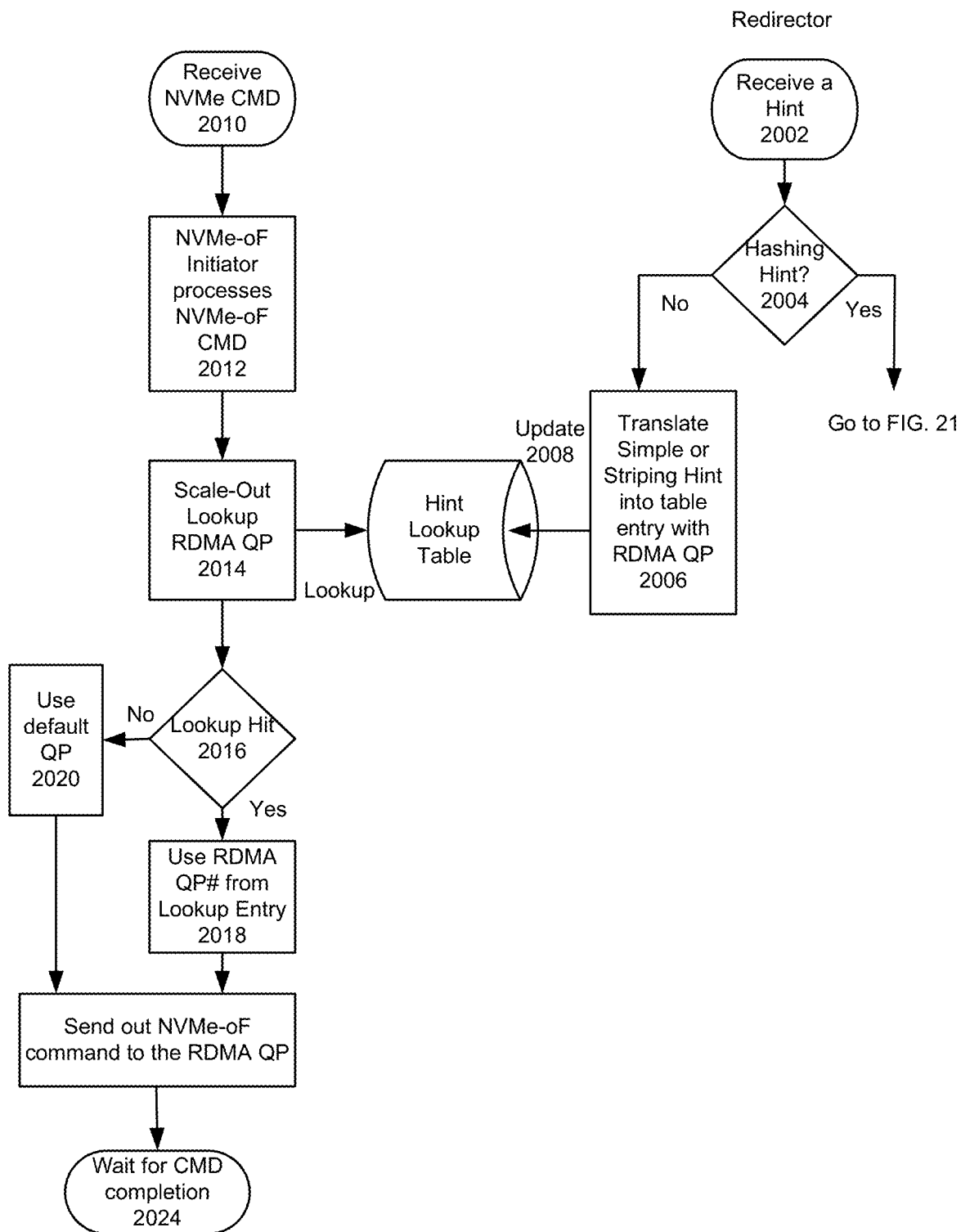
FIG. 20 depicts a process to perform hint processing and translate hints for a target node access.

FIG. 20 depicts a process to perform hint processing and translate hints into an RDMA QP for a target node access. The process can be performed by a redirector and/or initiator. Other types of remote direction copying can be performed such as by use of iWARP and/or RoCE protocols. At 2002, hints can be received from storage nodes that are remote to a NIC or even local (same rack, server, data center) to a NIC. Hints can indicate information concerning storage nodes that can be used by the NIC to identify a queue pair (QP) for use to convey a command such as an NVMe or NVMe-oF read or write command. A NIC can receive simple hints, striping (striped) hints, or hash hints.

At 2004, a determination is made if the received hint is a hashing hint. If the received hint is not a hashing hint, then 2006 follows. If the received hint is a hashing hint, then the process continues to FIG. 21.

At 2006, simple or striping hint process is performed. For a simple or striping hint, simple or striping hint is translated into a table entry with RDMA QP number and a hint lookup table is updated at 2008. Simple hint processing can include translating the information in fields (Subsystem NQN, Destination NGUID) tuples into an RDMA QP. A redirector or other entity can store a mapping table between (Subsystem NQN, Destination NGUID) and RDMA QP. When an RDMA QP is setup with a remote target, the corresponding RDMA QP can be added into a lookup table.

Striping hint processing can include simple hint processing and is repeated for every extent (remote target), the output is a list of RDMA QPs.

On the left side of the process of FIG. 20, at 2010, an application executing on a host (e.g., running in a virtualized execution environment) issues an NVMe command (CMD) to a network interface. At 2012, an NVMe-oF initiator processes the CMD. The CMD specifies the namespace ID (NSID) and an LBA. The NSID and the LBA number are used in 2014 for a lookup in the hint lookup table to find a QP identifier based on the NSID. At 2016, a determination is made if a lookup hit is found. If a lookup hit is found, then the process continues to 2018, where the looked-up RDMA QP number from a lookup entry is used to perform the CMD. If a lookup hit is not found, at 2020, a default QP number is used or the command is provided to SoC software for processing. After a QP number is identified, the process continues to 2022.

At 2022, the NIC can send an NMVe-oF command to a device associated with an identified RDMA QP number. Protocols other than RDMA can be used such as iWARP, RoCE, QUIC, TCP or other transport protocols. At 2024, the NIC can wait for CMD completion, e.g., response from remote server with data (read) or completion (write).

FIG. 21 depicts a process to process hashing hints. On the right side, processing of a hashing hint is performed where the hashing hint is received from a local or remote storage node using a packet or a remote redirector that sends a hashing hint using a packet. A software-based redirector or other hardware and/or software can perform the processing of the right-side of FIG. 21. If the hint is simple or striped, the process of FIG. 20 is used. For a hashed hint, the process continues to 2102. At 2102, a hash hint log page is processed, the lookup table with the prefix string (pre-str) for a namespace and object size (obj size) is programmed or updated. At 2104, the hash hint is processed to determine the number of RDMA queue pair (QPs) used for the NSID. At 2106, the hash lookup table is updated or programmed with the mapping between a hash value and RDMA QP number. Accordingly, a lookup table and hash table lookup can be updated using hashing hints.

A left side process is described next and can be used to process a received command. The left side process of FIG. 21 can be performed by a hardware-based initiator or other hardware and/or software. At 2110, an application executing on a host (e.g., running in a virtualized execution environment) issues an NVMe command (CMD) to a network interface. At 2112, an NVMe-oF initiator processes the CMD and converts the command into an NVMe-oF command. CMD specifies the namespace ID (NSID) and specifies an LBA. The NSID is used in a lookup to find prefix string and object size.

At 2114, the NIC determines the prefix string and object size associated with an NSID from a first lookup table whereby an NSID is used to lookup the prefix string and object size. At 2116, the NIC calculates objectID based on LBA number and object size and reformats objectID to a string (pre-str.obj str). For example, reformatting objectID to a string can allow compatibility with Jenkins hashing or other hashing scheme. In some example, a prefix string is not looked up or used. At 2118, a long string is input to a hash engine to generate a hash value. For example, a hash engine uses fields (pre-str.objstr) and generates a hash value. A hash engine (e.g., part of scale-out system and lookup tables) can use Jenkins or other hash scheme to calculate a hash value. The hash value can further be updated by a simple stable modulo function that is used in Ceph CRUSH algorithm. At 2120, the hash value is used to find RDMA QP number from a second lookup table. At 2122, the NIC can send the NMVe-oF command to the device associated with the RDMA QP. Protocols other than RDMA can be used such as iWARP, RoCE, QUIC, TCP or other transport protocols. The NIC can wait for CMD completion, e.g., response from remote server with data (read) or completion (write).

For Storage Performance Development Kit (SPDK), an example of how a redirector applies all the location hints it has accumulated from all the other redirectors in the NVMe data path is described next. The SPDK implementation starts by making a simplifying assumption/requirement that I/Os and hints will align on some bounds (128K, etc.). A Smart NIC implementation can cause I/Os and hints to align on some bounds to enable simplified lookup. The redirector reduces the complete location hint set to those referring to targets it is currently connected to. These are sorted by starting LBA (low to high) and specificity (largest LBA range to smallest BLA range). Hints referring to the exact same LBA range as the one before them are discarded. This reduced set of hints is then transformed into what the SPDK implementation calls the rule table. The rule table is an ordered list of LBA, target pairs. Conceptually this is produced by considering LBAs in the logical namespace in order, determining which target is indicated by the most specific hint in the reduced list that includes the LBA being considered, and adding an entry to the rule table if this LBA goes to a different target than the previous LBA. The SPDK implementation walks the reduced hint list in order, maintaining a stack of hints it has looked past to find more specific hints. Edges of the location hints are found without considering each LBA, and omits the rule table as it goes. During an I/O, the SPDK implementation performs a binary search on the IO start LBA in the rule table. The highest entry with an LBA<=the LBA of the IO is the target that will be used.

Figure 22:
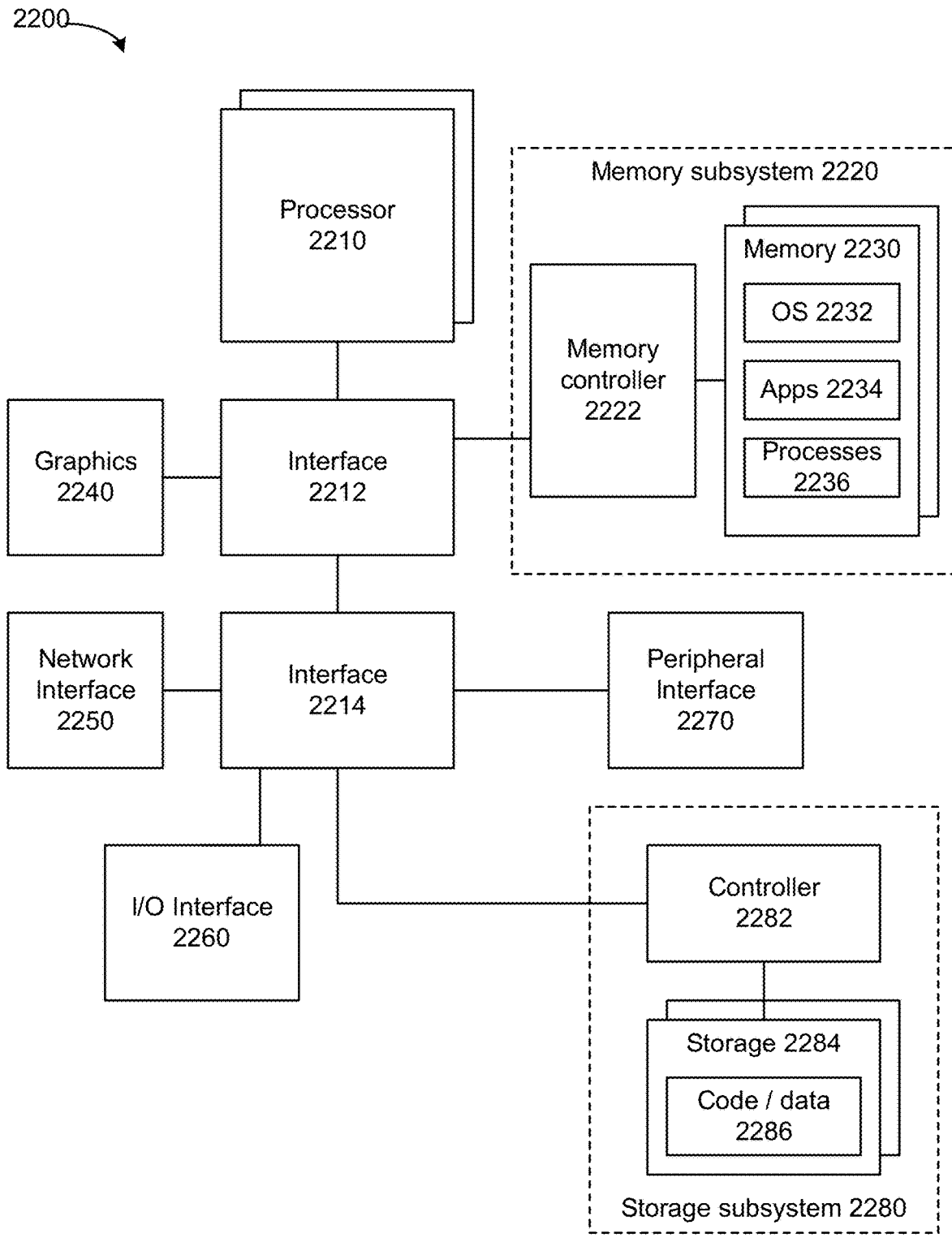
FIG. 22 depicts a system.

FIG. 22 depicts a system. The system can use embodiments described herein at least to use technologies described herein to at least with respect to management of direct mapping of connected storage or other nodes that storage LBAs and updating of a lookup table of node addresses based on received hints. System 2200 includes processor 2210, which provides processing, operation management, and execution of instructions for system 2200. Processor 2210 can include any type of microprocessor, central processing unit (CPU), graphics processing unit (GPU), processing core, or other processing hardware to provide processing for system 2200, or a combination of processors. Processor 2210 controls the overall operation of system 2200, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 2200 includes interface 2212 coupled to processor 2210, which can represent a higher speed interface or a high throughput interface for system components that needs higher bandwidth connections, such as memory subsystem 2220 or graphics interface components 2240, or accelerators 2242. Interface 2212 represents an interface circuit, which can be a standalone component or integrated onto a processor die. Where present, graphics interface 2240 interfaces to graphics components for providing a visual display to a user of system 2200. In one example, graphics interface 2240 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 2240 generates a display based on data stored in memory 2230 or based on operations executed by processor 2210 or both. In one example, graphics interface 2240 generates a display based on data stored in memory 2230 or based on operations executed by processor 2210 or both.

Accelerators 2242 can be a fixed function offload engine that can be accessed or used by a processor 2210. For example, an accelerator among accelerators 2242 can provide compression (DC) capability, cryptography services such as public key encryption (PKE), cipher, hash/authentication capabilities, decryption, or other capabilities or services. In some embodiments, in addition or alternatively, an accelerator among accelerators 2242 provides field select controller capabilities as described herein. In some cases, accelerators 2242 can be integrated into a CPU socket (e.g., a connector to a motherboard or circuit board that includes a CPU and provides an electrical interface with the CPU). For example, accelerators 2242 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 2242 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 2220 represents the main memory of system 2200 and provides storage for code to be executed by processor 2210, or data values to be used in executing a routine. Memory subsystem 2220 can include one or more memory devices 2230 such as read-only memory (ROM), flash memory, one or more varieties of random access memory (RAM) such as DRAM, or other memory devices, or a combination of such devices. Memory 2230 stores and hosts, among other things, operating system (OS) 2232 to provide a software platform for execution of instructions in system 2200. Additionally, applications 2234 can execute on the software platform of OS 2232 from memory 2230. Applications 2234 and OS 2232 can be executed within a virtual machine environment or container environment with distinct allocated memory regions. Applications 2234 represent programs that have their own operational logic to perform execution of one or more functions. Processes 2236 represent agents or routines that provide auxiliary functions to OS 2232 or one or more applications 2234 or a combination. OS 2232, applications 2234, and processes 2236 provide software logic to provide functions for system 2200. In one example, memory subsystem 2220 includes memory controller 2222, which is a memory controller to generate and issue commands to memory 2230. It will be understood that memory controller 2222 could be a physical part of processor 2210 or a physical part of interface 2212. For example, memory controller 2222 can be an integrated memory controller, integrated onto a circuit with processor 2210.

While not specifically illustrated, it will be understood that system 2200 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 2200 includes interface 2214, which can be coupled to interface 2212. In one example, interface 2214 represents an interface circuit, which can include standalone components and integrated circuitry. In one example, multiple user interface components or peripheral components, or both, couple to interface 2214. Network interface 2250 provides system 2200 the ability to communicate with remote devices (e.g., servers or other computing devices) over one or more networks. Network interface 2250 can include an Ethernet adapter, wireless interconnection components, cellular network interconnection components, USB (universal serial bus), or other wired or wireless standards-based or proprietary interfaces. Network interface 2250 can transmit data to a device that is in the same data center or rack or a remote device, which can include sending data stored in memory. Network interface 2250 can receive data from a remote device, which can include storing received data into memory. Various embodiments can be used in connection with network interface 2250, processor 2210, and memory subsystem 2220.

In one example, system 2200 includes one or more input/output (I/O) interface(s) 2260. I/O interface 2260 can include one or more interface components through which a user interacts with system 2200 (e.g., audio, alphanumeric, tactile/touch, or other interfacing). Peripheral interface 2270 can include any hardware interface not specifically mentioned above. Peripherals refer generally to devices that connect dependently to system 2200. A dependent connection is one where system 2200 provides the software platform or hardware platform or both on which operation executes, and with which a user interacts.

In one example, system 2200 includes storage subsystem 2280 to store data in a nonvolatile manner. In one example, in certain system implementations, at least certain components of storage 2280 can overlap with components of memory subsystem 2220. Storage subsystem 2280 includes storage device(s) 2284, which can be or include any conventional medium for storing large amounts of data in a nonvolatile manner, such as one or more magnetic, solid state, or optical based disks, or a combination. Storage 2284 holds code or instructions and data 2286 in a persistent state (i.e., the value is retained despite interruption of power to system 2200). Storage 2284 can be generically considered to be a "memory," although memory 2230 is typically the executing or operating memory to provide instructions to processor 2210. Whereas storage 2284 is nonvolatile, memory 2230 can include volatile memory (i.e., the value or state of the data is indeterminate if power is interrupted to system 2200). In one example, storage subsystem 2280 includes controller 2282 to interface with storage 2284. In one example controller 2282 is a physical part of interface 2214 or processor 2210 or can include circuits or logic in both processor 2210 and interface 2214.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 2200. More specifically, power source typically interfaces to one or multiple power supplies in system 2200 to provide power to the components of system 2200. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 2200 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (i.e., buses) for coupling appropriate integrated circuits (ICs) and other components mounted to the board.

Various embodiments can be used in data centers to scale-out storage or memory transactions involving memory pools, storage pools, or accelerators and using NVMe-oF. Various embodiments can be used by cloud service providers that use distributed resources (e.g., compute, memory, storage, accelerators, storage). Distributed resources can be located among one or more of: a base station, fog data center, edge data center, or remote data center. Various embodiments can be used in a base station that supports communications using wired or wireless protocols (e.g., 3GPP Long Term Evolution (LTE) (4G) or 3GPP 5G), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Figure 23:
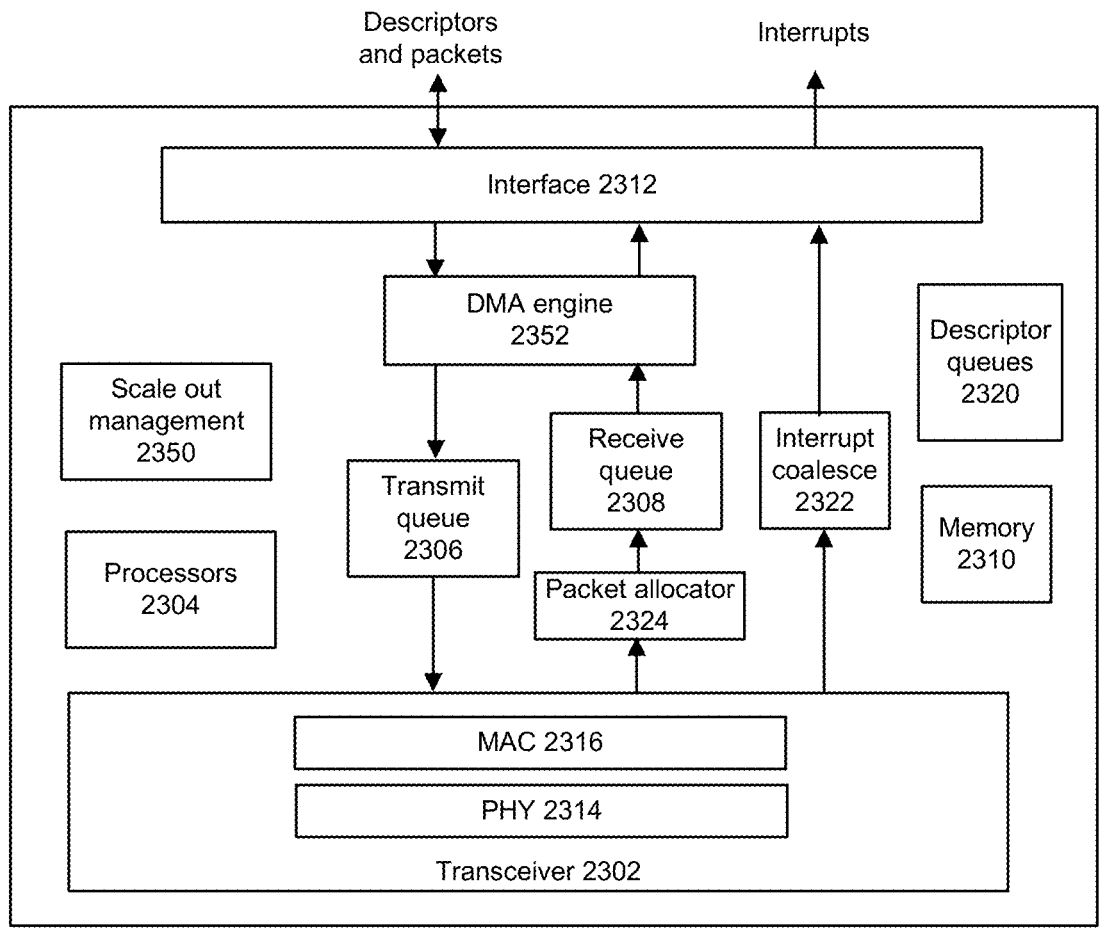
FIG. 23 depicts an example network interface.

FIG. 23 depicts an example network interface. Transceiver 2302 can be capable of receiving and transmitting packets in conformance with the applicable protocols such as Ethernet as described in IEEE 802.3, although other protocols may be used, such as but not limited to protocols described herein. Transceiver 2302 can receive and transmit packets from and to a network via a network medium (not depicted). Transceiver 2302 can include PHY circuitry 2314 and media access control (MAC) circuitry 2316. PHY circuitry 2314 can include encoding and decoding circuitry (not shown) to encode and decode data packets. MAC circuitry 2316 can be configured to assemble data to be transmitted into packets, that include destination and source addresses along with network control information and error detection hash values. Processors 2304 can be any processor, core, graphics processing unit (GPU), or other programmable hardware device that allow programming of network interface 2300.

Packet allocator 2324 can provide distribution of received packets for processing by multiple CPUs or cores using receive side scaling (RSS). Packet allocator 2324 can calculate a hash or make another determination based on contents of a received packet to determine which CPU or core is to process a packet.

Interrupt coalesce 2322 can perform interrupt moderation whereby network interface interrupt coalesce 2322 waits for multiple packets to arrive, or for a time-out to expire, before generating an interrupt to host system to process received packet(s). Receive Segment Coalescing (RSC) can be performed by network interface 2300 whereby portions of incoming packets are combined into segments of a packet. Network interface 2300 provides this coalesced packet to an application.

Scale out management 2350 can be used to perform embodiments described herein at least with respect to management of direct mapping of storage or other nodes that storage LBAs and updating of a lookup table of node addresses based on received hints.

Direct memory access (DMA) engine 2352 can copy a packet header, packet payload, and/or descriptor directly from host memory to the network interface or vice versa, instead of copying the packet to an intermediate buffer at the host and then using another copy operation from the intermediate buffer to the destination buffer.

Memory 2310 can be any type of volatile or non-volatile memory device and can store any queue or instructions used to program network interface 2300. Transmit queue 2306 can include data or references to data for transmission by network interface. Receive queue 2308 can include data or references to data that was received by network interface from a network. Descriptor queues 2320 can include descriptors that reference data or packets in transmit queue 2306 or receive queue 2308. Bus interface 2312 can provide an interface with host device (not depicted). For example, bus interface 2312 can be compatible with PCI, PCI Express, PCI-x, Serial ATA, and/or USB compatible interface (although other interconnection standards may be used).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores"

may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a network interface comprising: an initiator to determine a storage node associated with an access command based on an association between an address in the access command and a storage node and a redirector to update the association between an address in the access command and a storage node based on messages from one or more remote storage nodes.

Example 2 includes any example, wherein the association comprises a namespace identifier corresponding to a prefix string and/or object size.

Example 3 includes any example, and includes a table including at least one association.

Example 4 includes any example, wherein the access command is compatible with a protocol employed by NVMe over Fabrics.

Example 5 includes any example, wherein the access command comprises one or more of the following: a write, a read, a command, and status request.

Example 6 includes any example, wherein the initiator is to determine a string and prefix string for a namespace.

Example 7 includes any example, wherein the initiator is to calculate a hash based on the string.

Example 8 includes any example, wherein the initiator is to determine a remote direct memory access (RDMA) queue-pair (QP) lookup using a table based on the hash.

Example 9 includes any example, wherein to update the association between an address in the access command and a storage node based on messages from one or more remote storage nodes and wherein a message includes a hint, the redirector is to: based on detection that the hint is a simple hint or striped hint: update an association between simple or striping hint with a remote direct memory access (RDMA) queue-pair (QP) number or based on detection that the hint is a hash hint: process a hash hint log, update an association between a prefix string for a namespace and object size, process the hash hint to determine a RDMA QP number used for a namespace identifier (NSID), and update an association between a hash value to be with the determined RDMA QP number.

Example 10 includes any example, wherein the initiator is to identify a remote direct memory access (RDMA) queue-pair (QP) for a namespace identifier using a lookup and use the identified RDMA QP to transmit a command to a storage node.

Example 11 includes any example, wherein the initiator is to identify a remote direct memory access (RDMA) queue-pair (QP) for a namespace identifier (NSID) using a lookup and if an RDMA QP is not identified for an NSID, a default RDMA QP is used to transmit a command to a storage node.

Example 12 includes any example, and includes one or more of: a host device, server, rack, or datacenter.

Example 13 includes a method, performed in a network interface, comprising: determining a storage node associated with an access command based on an association between an address in the access command and a storage node and updating the association based on messages from one or more remote storage nodes.

Example 14 includes any example, wherein the association comprises a look-up table associating namespace identifier with prefix string and object size.

Example 15 includes any example, wherein the access command is compatible with NVMe over Fabrics.

Example 16 includes any example, wherein the access command comprises a write, a read, a command, or status request.

Example 17 includes any example and includes calculating a hash based on the access command and determining a remote direct memory access (RDMA) queue-pair (QP) lookup based on the hash.

Example 18 includes a system comprising: one or more remote storage nodes and a network interface communicatively coupled to one or more remote storage nodes, the network interface comprising: an initiator to determine a storage node associated with an access command based on an association between an address in the access command and a storage node and a redirector to update the association based on messages from one or more remote storage nodes.

Example 19 includes any example, wherein the association comprises a look-up table to associate a namespace identifier with prefix string and object size.

Example 20 includes any example, wherein the access command is compatible with NVMe over Fabrics.

Example 21 includes any example, wherein the initiator is to determine a remote direct memory access (RDMA) queue-pair (QP) lookup using a table based on a hash.

What is claimed is:

1. A network interface device comprising:
a host interface;
a direct memory access (DMA) circuitry;
a network interface to transmit and receive Ethernet packets;
circuitry to determine a storage node associated with an access command based on an association between an address in the access command and the storage node; and
second circuitry to update the association between the address in the access command and the storage node based on one or more messages received by the network interface in one or more packets from one or more remote storage nodes; and
third circuitry to transmit data in one or more Ethernet packets to a destination, wherein:
the data comprises data that is independent from the access command;
the access command is consistent with a Non-volatile memory express (NVMe) over Fabrics (NVMe-oF) specification, and
the network interface device is to transmit the access command from a remote direct memory access (RDMA) queue-pair (QP) in one or more packets.

2. The network interface device of claim 1, wherein the association comprises a namespace identifier corresponding to a prefix string and/or object size.

3. The network interface device of claim 2, further comprising a memory to store table including at least one association.

4. The network interface device of claim 1, wherein the access command comprises one or more of: a write, a read, a command, and a status request.

5. The network interface device of claim 1, wherein the circuitry is to determine a string and prefix string for a namespace.

6. The network interface device of claim 5, wherein the circuitry is to calculate a hash based on the string.

7. The network interface device of claim 6, wherein the circuitry is to determine the RDMA QP by a lookup by access to a table based on the hash.

8. The network interface device of claim 1, wherein the circuitry is to identify an RDMA QP for a namespace identifier based on a lookup and use the identified RDMA QP to transmit a command to the storage node.

9. The network interface device of claim 1, wherein the circuitry is to identify an RDMA QP for a namespace identifier (NSID) based on a lookup and if an RDMA QP is not identified for the NSID, a default RDMA QP is used to transmit a command to the storage node.

10. The network interface device of claim 1, comprising one or more of: a host device, server, rack, or datacenter, wherein the host interface is coupled to the host device, server, rack, or datacenter.

11. The network interface device of claim 1, wherein:
the second circuitry is to:
based on the one or more messages comprising a first type: update the association between the address and a first RDMA QP number and
based on the one or more messages comprising a second type: update the association between a hash value and a second RDMA QP number.

12. A method, performed in a network interface, comprising:
a network interface device comprising circuitry to transmit and receive Ethernet packets, the network interface device performing:
determining a storage node associated with an access command based on an association between an address in the access command and the storage node, wherein the access command is consistent with a Non-volatile memory express (NVMe) over Fabrics (NVMe-oF) specification;
updating the association between the address in the access command and the storage node based on one or more messages received by the network interface device from one or more remote storage nodes;
transmitting Ethernet packets to access the storage node, wherein the transmitting Ethernet packets to access the storage node comprises transmitting the access command from a remote direct memory access (RDMA) queue-pair (QP) in the Ethernet packets; and
independent from the access to the storage node, transmitting an Ethernet packet to a destination device.

13. The method of claim 12, wherein the association comprises a look-up table, stored in the network interface device, associating namespace identifier with prefix string and object size.

14. The method of claim 12, wherein the access command is compatible with Non-volatile Memory Express over Fabrics (NVMe-oF).

15. The method of claim 12, wherein the access command comprises a write, a read, a command, or status request.

16. The method of claim 12, comprising: the network interface device calculating a hash based on the access command and determining a remote direct memory access (RDMA) queue-pair (QP) lookup based on the hash.

17. At least one non-transitory computer-readable medium comprising instructions stored thereon, that when executed by one or more processors, cause the one or more processors to:
configure a network interface device, comprising a host interface, a direct memory access (DMA) circuitry, and a network interface to transmit and receive Ethernet packets, to:
determine a storage node associated with an access command based on an association between an address in the access command and the storage node;
update the association between the address in the access command and the storage node based on a message received by the network interface in one or more packets from one or more remote storage nodes; and
transmit data in one or more Ethernet packets to a destination, wherein
the data comprises data that is independent from the access command,
the access command is consistent with a Non-volatile memory express (NVMe) over Fabrics (NVMe-oF) specification, and the network interface device is to transmit the access command from a remote direct memory access (RDMA) queue-pair (QP) in one or more packets.

18. The computer-readable medium of claim 17, wherein the association comprises a look-up table, stored in the network interface device, that associates a namespace identifier with prefix string and object size.

19. The computer-readable medium of claim 17, wherein the access command comprises a write, a read, a command, or status request.

* * * * *